(12) United States Patent
Aiba et al.

(10) Patent No.: US 11,177,866 B2
(45) Date of Patent: Nov. 16, 2021

(54) TERMINAL APPARATUS, BASE STATION APPARATUS, COMMUNICATION METHOD, AND INTEGRATED CIRCUIT

(71) Applicant: Sharp Kabushiki Kaisha, Sakai (JP)

(72) Inventors: Tatsushi Aiba, Sakai (JP); Shoichi Suzuki, Sakai (JP); Wataru Ouchi, Sakai (JP); Takashi Hayashi, Sakai (JP); Tomoki Yoshimura, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/095,958

(22) PCT Filed: Feb. 2, 2017

(86) PCT No.: PCT/JP2017/003747
§ 371 (c)(1),
(2) Date: Oct. 24, 2018

(87) PCT Pub. No.: WO2017/187697
PCT Pub. Date: Nov. 2, 2017

(65) Prior Publication Data
US 2019/0140725 A1    May 9, 2019

(30) Foreign Application Priority Data

Apr. 28, 2016    (JP) .............................. JP2016-090464

(51) Int. Cl.
*H04B 7/06* (2006.01)
*H04W 24/10* (2009.01)
(Continued)

(52) U.S. Cl.
CPC .......... *H04B 7/0626* (2013.01); *H04W 24/10* (2013.01); *H04W 72/0446* (2013.01);
(Continued)

(58) Field of Classification Search
None
See application file for complete search history.

(56) References Cited

U.S. PATENT DOCUMENTS

2011/0244847 A1* 10/2011 Mallik ................ H04B 7/0626
455/422.1
2012/0120910 A1* 5/2012 Mazzarese ............ H04L 5/0048
370/330
(Continued)

FOREIGN PATENT DOCUMENTS

JP    2013-535116 A    9/2013

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.2, Feb. 2016, 140 pages.
(Continued)

*Primary Examiner* — Andrew C Oh
(74) *Attorney, Agent, or Firm* — ScienBiziP, P.C.

(57) ABSTRACT

To efficiently transmit channel state information. A terminal apparatus includes a receiver configured to receive information for configuring a first mode and information for configuring a second mode and receive an UL grant to be used for scheduling of a PUSCH and an UL grant to be used for scheduling of a sPUSCH; and transmits CSI on the PUSCH by using the first mode, based on the UL grant to be used for scheduling of the PUSCH, and transmits CSI on the sPUSCH by using the second mode, based on the UL grant to be used for scheduling of the sPUSCH.

4 Claims, 10 Drawing Sheets

(51) Int. Cl.
    *H04W 72/12*         (2009.01)
    *H04W 72/04*         (2009.01)

(52) U.S. Cl.
    CPC ....... *H04W 72/12* (2013.01); *H04W 72/1268* (2013.01); *H04W 72/1289* (2013.01)

(56) References Cited

U.S. PATENT DOCUMENTS

| | | | |
|---|---|---|---|
| 2012/0147773 A1* | 6/2012 | Kim | H04L 1/0025 370/252 |
| 2013/0077704 A1 | 3/2013 | Ding et al. | |
| 2013/0336214 A1* | 12/2013 | Sayana | H04W 72/085 370/328 |
| 2014/0105055 A1* | 4/2014 | Kang | H04W 24/10 370/252 |
| 2014/0126476 A1* | 5/2014 | Kang | H04L 5/0048 370/328 |
| 2014/0192917 A1* | 7/2014 | Nam | H04L 5/005 375/267 |
| 2014/0355550 A1* | 12/2014 | Yano | H04W 72/0406 370/329 |
| 2014/0376485 A1* | 12/2014 | Lee | H04B 7/0456 370/329 |
| 2015/0111505 A1* | 4/2015 | Kim | H04W 24/08 455/67.13 |
| 2015/0131568 A1* | 5/2015 | You | H04W 88/02 370/329 |
| 2015/0139101 A1* | 5/2015 | Guo | H04W 72/10 370/329 |
| 2015/0155926 A1 | 6/2015 | Ding et al. | |
| 2015/0172940 A1* | 6/2015 | Nagata | H04W 24/08 370/252 |
| 2015/0327246 A1* | 11/2015 | Kim | H04B 7/0639 370/329 |
| 2015/0365831 A1* | 12/2015 | Ko | H04L 5/0053 370/329 |
| 2016/0014778 A1* | 1/2016 | Zhou | H04L 5/0053 370/252 |
| 2016/0135147 A1* | 5/2016 | Ouchi | H04W 72/042 370/329 |
| 2016/0150490 A1* | 5/2016 | Ouchi | H04W 52/16 455/522 |
| 2016/0165545 A1* | 6/2016 | Ouchi | H04W 52/228 455/522 |
| 2016/0165547 A1* | 6/2016 | Ouchi | H04W 52/146 455/522 |
| 2016/0219547 A1* | 7/2016 | Seo | H04L 5/14 |
| 2016/0255649 A1* | 9/2016 | Kusashima | H04W 72/1289 370/280 |
| 2016/0261296 A1* | 9/2016 | Ouchi | H04L 5/14 |
| 2016/0270060 A1* | 9/2016 | Kusashima | H04W 72/042 |
| 2016/0323855 A1* | 11/2016 | Nakamura | H04L 1/0004 |
| 2016/0381681 A1* | 12/2016 | Nogami | H04W 72/0446 370/280 |
| 2017/0005770 A1* | 1/2017 | Shimezawa | H04L 5/0092 |
| 2017/0019883 A1* | 1/2017 | Nimbalker | H04W 72/0446 |
| 2017/0019894 A1* | 1/2017 | Nimbalker | H04L 5/0053 |
| 2017/0034808 A1* | 2/2017 | Ouchi | H04W 52/226 |
| 2017/0141833 A1* | 5/2017 | Kim | H04L 1/0029 |
| 2017/0170931 A1* | 6/2017 | Kusashima | H04L 5/001 |
| 2017/0181022 A1* | 6/2017 | Yang | H04B 7/0456 |
| 2017/0223725 A1* | 8/2017 | Xiong | H04W 72/042 |
| 2017/0238287 A1* | 8/2017 | Kusashima | H04L 1/1854 370/280 |
| 2017/0280454 A1* | 9/2017 | Kusashima | H04L 1/1812 |
| 2017/0290008 A1* | 10/2017 | Tooher | H04L 1/1893 |
| 2017/0303182 A1* | 10/2017 | Uchino | H04W 16/12 |
| 2017/0310447 A1* | 10/2017 | Kusashima | H04W 72/044 |
| 2018/0020429 A1* | 1/2018 | Aiba | H04L 1/0004 |
| 2018/0302900 A1* | 10/2018 | Ibars Casas | H04W 72/042 |
| 2018/0310332 A1* | 10/2018 | Ahn | H04W 74/0816 |

OTHER PUBLICATIONS

Huawei, HiSilicon, Discussion on CSI feedback for short TTI, 3GPP TSG-RAN WG1#84b R1-162589, Apr. 2, 2016.

\* cited by examiner

| TTI index | TTI length | DMRS position | Cyclic shift of DMRS | Grant to TX delay offset | (s)PUSCH transmission (SC-FDMA symbols) | | | | | | |
|---|---|---|---|---|---|---|---|---|---|---|---|
| | | | | | #0 | #1 | #2 | #3 | #4 | #5 | #6 |
| 0 | 2 | 0 | 0 | 0 | R | D | | | | | |
| 1 | 2 | 1 | 4 | 1 | D | R | | | | | |
| 2 | 2 | 2 | 8 | 2 | D | | R | | | | |
| 3 | 2 | 3 | 12 | 3 | D | | | R | | | |
| 4 | 2 | -1 | 0 | 0 | R | | D | | | | |
| 5 | 2 | -2 | 4 | 1 | R | | | D | | | |
| 6 | 3 | 0 | 8 | 2 | R | D | D | | | | |
| 7 | 3 | 1 | 12 | 3 | D | R | D | | | | |
| 8 | 3 | 2 | 0 | 0 | D | D | R | | | | |
| 9 | 3 | 3 | 4 | 1 | D | D | | R | | | |
| 10 | 3 | -1 | 8 | 2 | R | | D | D | | | |
| 11 | 4 | 0 | 12 | 3 | R | D | D | D | | | |
| 12 | 4 | 1 | 0 | 1 | D | R | D | D | | | |
| 13 | 4 | 2 | 4 | 0 | D | D | R | D | | | |
| 14 | 4 | 3 | 8 | 2 | D | D | D | R | | | |
| 15 | 7 | 3 | 0 | 0 | D | D | D | R | D | D | D |

FIG. 4

| TTI length (SC-FDMA symbols) | Fixed delay (minimum delay) between first symbol of UL grant and first symbol of (s)PUSCH |
|---|---|
| 2 | 2 x 4 = 8 symbols |
| 3 | 3 x 4 = 12 symbols |
| 4 | 4 x 4 = 16 symbols |
| 7 | 7 x 4 = 28 symbols (2 ms) |
| 14 (1 ms) | 14 x 4 = 56 symbols (4 ms) |

FIG. 5

CQI and PMI Feedback Types for PUSCH/sPUSCH CSI reporting Modes

| | PMI Feedback Type | | |
|---|---|---|---|
| PUSCH/sPUSCH CQI Feedback Type | No PMI | Single PMI | Multiple PMI |
| Wideband (wideband CQI) | Mode 1-0 | Mode 1-1 | Mode 1-2 |
| UE Selected (subband CQI) | Mode 2-0 | | Mode 2-2 |
| Higher Layer configured (subband CQI) | Mode 3-0 | Mode 3-1 | Mode 3-2 |

FIG. 6

(a) 1-bit CSI Request field

| Value of CSI request field | Description |
|---|---|
| '0' | No aperiodic CSI report is triggered |
| '1' | For PUSCH, aperiodic CSI report is triggered for serving cell c, and/or, 1st reporting mode configured by higher layers, and/or, For sPUSCH, aperiodic CSI report is triggered for serving cell c, and/or, 2nd reporting mode configured by higher layers |

(b) 2-bit CSI Request field

| Value of CSI request field | Description |
|---|---|
| '00' | No aperiodic CSI report is triggered |
| '01' | For PUSCH, aperiodic CSI report is triggered for serving cell c, and/or, 1st reporting mode configured by higher layers, and/or, For sPUSCH, aperiodic CSI report is triggered for serving cell c, and/or, 2nd reporting mode configured by higher layers |
| '10' | For PUSCH, aperiodic CSI report is triggered for a 1st set of serving cells configured by higher layers, and/or, 3rd reporting mode configured by higher layers, and/or, For sPUSCH, aperiodic CSI report is triggered for a 2nd set of serving cells configured by higher layers, and/or, 4th reporting mode configured by higher layers |
| '11' | For PUSCH, aperiodic CSI report is triggered for a 3rd set of serving cells configured by higher layers, and/or, 5th reporting mode configured by higher layers, and/or, For sPUSCH, aperiodic CSI report is triggered for a 4th set of serving cells configured by higher layers, and/or, 6th reporting mode configured by higher layers |

FIG. 8

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-090464 filed in Japan on Apr. 28, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL 1). In LTE, a base station apparatus is also referred to as an evolved NodeB (eNodeB), and a terminal apparatus is also referred to as a User Equipment (UE). LTE is a cellular communication system in which multiple areas covered by the base station apparatuses are deployed to form a cellular structure. In such a cellular communication system, a single base station apparatus may manage multiple cells.

In 3GPP, latency reduction enhancements have been studied. For example, as a solution for achieving reduction of latency, Semi-Persistent Scheduling (SPS), UL Grant reception, Configured SPS activation and deactivation have been studied (NPL 1).

CITATION LIST

Non Patent Literature

NPL 1: 3GPP TR 36.881 V0.5.2 (2016-02) Evolved Universal Terrestrial Radio Access (E-UTRA); Study on latency reduction techniques for LTE (Release 13), R2-161963, Ericsson.

SUMMARY OF INVENTION

Technical Problem

However, for the radio communication system as described above, no concrete method for a procedure for transmitting Channel state information (CSI) in downlink has been sufficiently studied.

The present invention has been made in light of the foregoing, and an object of the present invention is to provide a terminal apparatus, a base station apparatus, a communication method, and an integrated circuit that enable efficient transmission of channel state information.

Solution to Problem (1) To accomplish the object described above, aspects of the present invention are contrived to provide the following measures. Specifically, a terminal apparatus according to an aspect of the present invention includes: a receiver configured to receive information for configuring a first mode for aperiodic CSI reporting and information for configuring a second mode for aperiodic CSI reporting and receive an UL grant to be used for scheduling of a PUSCH and an UL grant to be used for scheduling of a sPUSCH; and a transmitter configured to transmit CSI on the PUSCH by using the first mode in a first case that a first value of a CSI request field included in the UL grant to be used for scheduling of the PUSCH is set to trigger an aperiodic CSI report and transmit CSI on the sPUSCH by using the second mode in a second case that a second value of the CSI request field included in the UL grant to be used for scheduling of the sPUSCH is set to trigger the aperiodic CSI report.

(2) A base station apparatus according to an aspect of the present invention includes: a transmitter configured to transmit information for configuring a first mode for aperiodic CSI reporting and information for configuring a second mode for aperiodic CSI reporting and transmit an UL grant to be used for scheduling of a PUSCH and an UL grant to be used for scheduling of a sPUSCH; and a receiver configured to receive CSI on the PUSCH by using the first mode in a first case that a first value of a CSI request field included in the UL grant to be used for scheduling of the PUSCH is set to trigger an aperiodic CSI report and receive CSI on the sPUSCH by using the second mode in a second case that a second value of the CSI request field included in the UL grant to be used for scheduling of the sPUSCH is set to trigger the aperiodic CSI report.

(3) A communication method of a terminal apparatus according to an aspect of the present invention includes the steps of: receiving information for configuring a first mode for aperiodic CSI reporting and information for configuring a second mode for aperiodic CSI reporting; receiving an UL grant to be used for scheduling of a PUSCH and an UL grant to be used for scheduling of a sPUSCH; transmitting CSI on the PUSCH by using the first mode in a first case that a first value of a CSI request field included in the UL grant to be used for scheduling of the PUSCH is set to trigger an aperiodic CSI report; and transmitting CSI on the sPUSCH by using the second mode in a second case that a second value of the CSI request field included in the UL grant to be used for scheduling of the sPUSCH is set to trigger the aperiodic CSI report.

(4) A communication method of a base station apparatus according to an aspect of the present invention includes the steps of: transmitting information for configuring a first mode for aperiodic CSI reporting and information for configuring a second mode for aperiodic CSI reporting; transmitting an UL grant to be used for scheduling of a PUSCH and an UL grant to be used for scheduling of a sPUSCH; receiving CSI on the PUSCH by using the first mode in a first case that a first value of a CSI request field included in the UL grant to be used for scheduling of the PUSCH is set to trigger an aperiodic CSI report; and receiving CSI on the sPUSCH by using the second mode in a second case that a second value of the CSI request field included in the UL grant to be used for scheduling of the sPUSCH is set to trigger the aperiodic CSI report.

(5) An integrated circuit mounted on a terminal apparatus according to an aspect of the present invention causes the terminal apparatus to exert: a function of receiving information for configuring a first mode for aperiodic CSI reporting and information for configuring a second mode for aperiodic CSI reporting and receiving an UL grant to be used for scheduling of a PUSCH and an UL grant to be used for scheduling of a sPUSCH; and a function of transmitting CSI on the PUSCH by using the first mode in a first case that a first value of a CSI request field included in the UL grant to be used for scheduling of the PUSCH is set to trigger an aperiodic CSI report and transmitting CSI on the sPUSCH by using the second mode in a second case that a second value of the CSI request field included in the UL grant to be used for scheduling of the sPUSCH is set to trigger the aperiodic CSI report.

(6) An integrated circuit mounted on a base station apparatus according to an aspect of the present invention causes the base station apparatus to exert: a function of transmitting information for configuring a first mode for aperiodic CSI reporting and information for configuring a second mode for aperiodic CSI reporting and transmitting an UL grant to be used for scheduling of a PUSCH and an UL grant to be used for scheduling of a sPUSCH; and a function of receiving CSI on the PUSCH by using the first mode in a first case that a first value of a CSI request field included in the UL grant to be used for scheduling of the PUSCH is set to trigger an aperiodic CSI report and receiving CSI on the sPUSCH by using the second mode in a second case that a second value of the CSI request field included in the UL grant to be used for scheduling of the sPUSCH is set to trigger the aperiodic CSI report.

Advantageous Effects of Invention

According to the present invention, channel state information can be transmitted efficiently.

BRIEF DESCRIPTION OF DRAWINGS

FIG. 4 is another diagram illustrating the method of transmitting channel state information according to the present embodiment.

FIG. 5 is another diagram illustrating the method of transmitting channel state information according to the present embodiment.

FIG. 6 is a diagram for illustrating a reporting mode according to the present embodiment.

FIGS. 8A and 8B are other diagrams illustrating the method of transmitting channel state information according to the present embodiment.

DESCRIPTION OF EMBODIMENTS

Embodiments of the present invention will be described below.

Figure 1:
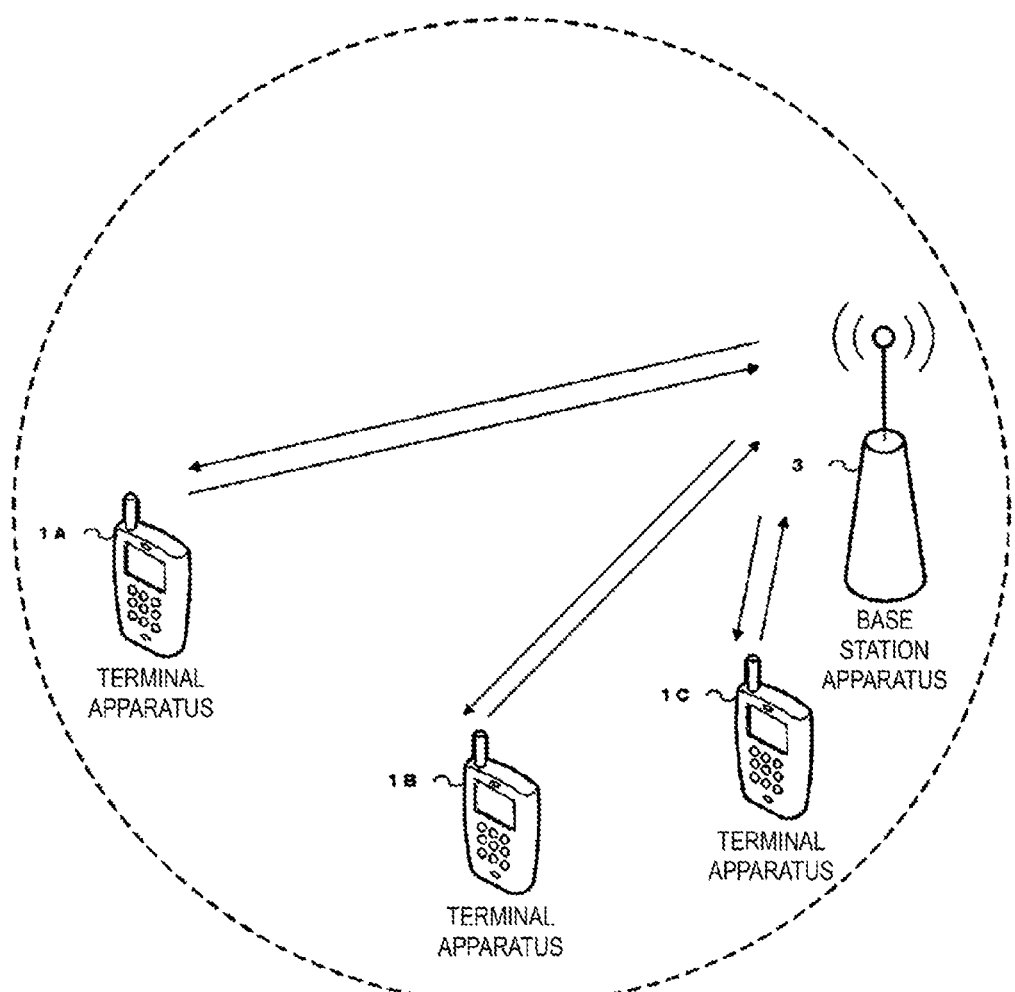
FIG. 1 is a diagram illustrating a concept of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, each of the terminal apparatuses 1A to 1C is also referred to as a terminal apparatus 1.

Physical channels and physical signals according to the present embodiment will be described.

In FIG. 1, the following uplink physical channels are used for uplink radio communication from the terminal apparatus 1 to the base station apparatus 3. Here, the uplink physical channels are used to transmit information output from the higher layers.

Physical Uplink Control Channel (PUCCH)
   short Physical Uplink Control Channel (sPUCCH, PUCCH for short TTI)
Physical Uplink Shared Channel (PUSCH)
   short Physical Uplink Shared Channel (sPUSCH, PUSCH for short TTI)
Physical Random Access Channel (PRACH)
   short Physical Random Access Channel (sPRACH, PRACH for short TTI)

The PUCCH and/or the sPUCCH is used to transmit Uplink Control Information (UCI). In the following, the PUCCH may include the sPUCCH. Here, the uplink control information may include Channel State Information (CSI) used to indicate a state of a downlink channel. The Uplink Control Information may include a Scheduling Request (SR) used to request an UL-SCH resource. The uplink control information may include Hybrid Automatic Repeat reQuest ACKnowledgement (HARQ-ACK).

Here, the HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PDSCH)). In other words, the HARQ-ACK may indicate acknowledgement (ACK; positive-acknowledgment) or negative-acknowledgement (NACK) for downlink data. Note that the CSI may be configured of a Channel quality indicator (CQI), a Precoding Matrix Indicator (PMI), and/or a Rank Indication (RI).

The PUSCH and/or the sPUSCH is used to transmit uplink data (Uplink-Shared Channel (UL-SCH)). In the following, the PUSCH may include the sPUSCH. Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station apparatus 3 and the terminal apparatus 1 may exchange (transmit and/or receive) signals with each other in higher layers. For example, the base station apparatus 3 and the terminal apparatus 1 may transmit and/or receive RRC signalling (also referred to as RRC message or RRC information) in a Radio Resource Control (RRC) layer. The base station apparatus 3 and the terminal apparatus 1 may exchange (transmit and/or receive) Medium Access Control (MAC) control elements in a MAC layer. Here, the RRC signalling and/or each MAC control element is also referred to as higher layer signaling.

Here, in the present embodiment, "higher layer parameter", "higher layer message", "higher layer signaling" "higher layer information", and "higher layer information element" may indicate the same.

In addition, the PUSCH may be used to transmit the RRC signalling and the MAC control element. Here, the RRC signalling transmitted from the base station apparatus 3 may be signalling common to multiple terminal apparatuses 1 in a cell. The RRC signalling transmitted from the base station apparatus 3 may be signalling dedicated to a certain terminal apparatus 1 (also referred to as dedicated signaling). In other words, user-equipment-specific information (information unique to user equipment) may be transmitted through signalling dedicated to the certain terminal apparatus 1.

The PRACH and/or the sPRACH is used to transmit a random access preamble. In the following, the PRACH may include the sPRACH. For example, the PRACH (or a random access procedure) is used in order mainly for the terminal apparatus 1 to perform synchronization with the base station apparatus 3 in terms of time domain. The PRACH (or the random access procedure) may also be used for an initial connection establishment procedure, a handover procedure, a connection re-establishment procedure, uplink transmission synchronization (timing adjustment), and transmission of a scheduling request (PUSCH resource request or UL-SCH resource request).

In FIG. 1, the following uplink physical signal is used in the uplink radio communication. Here, the uplink physical signal is not used to transmit information output from the higher layers but is used by the physical layer.

Reference Signal (UL RS)

In the present embodiment, the following two types of uplink reference signals are used.

Demodulation Reference Signal (DMRS)

Sounding Reference Signal (SRS)

The DMRS is associated with transmission of the PUSCH, the sPUSCH, and/or the PUCCH. Specifically, the DMRS may be time-multiplexed with the PUSCH, the sPUSCH, or the PUCCH. For example, the base station apparatus 3 may use the DMRS in order to perform channel compensation of the PUSCH, the sPUSCH, or the PUCCH.

Transmission of both the PUSCH and the DMRS is hereinafter also referred to simply as transmission of the PUSCH (performing transmission on the PUSCH). Transmission of both the sPUSCH and the DMRS is hereinafter also referred to simply as transmission of the sPUSCH (performing transmission on the sPUSCH). Transmission of both the PUCCH and the DMRS is hereinafter also referred to simply as transmission of the PUCCH (performing transmission on the PUCCH).

The SRS is not associated with the transmission of the PUSCH or the PUCCH. For example, the base station apparatus 3 may use SRS to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
short Physical Downlink Control Channel (sPDCCH, PDCCH for short TTI)
Physical Downlink Shared Channel (PDSCH)
short Physical Downlink Shared Channel (sPDSCH, PDSCH for short TTI)
Physical Multicast Channel (PMCH)

The PBCH is used to broadcast a Master Information Block (MIB, Broadcast Channel (BCH)), that is shared by the terminal apparatuses 1.

The PCFICH is used to transmit information indicating a region (OFDM symbols) to be used to transmit the PDCCH.

The PHICH is used to transmit a HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH, the EPDCCH, and/or the sPDCCH are used to transmit Downlink Control Information (DCI). In the present embodiment, the PDCCH may include the EPDCCH. Moreover, the PDCCH may include the sPDCCH.

Here, multiple DCI formats may be defined for the downlink control information transmitted on the PDCCH, the EPDCCH, and/or the sPDCCH. Specifically, a field for the downlink control information may be defined in a DCI format and mapped to information bits.

Here, the downlink DCI format is also referred to as downlink DCI, downlink grant, and/or downlink assignment. The uplink DCI format is also referred to as uplink DCI, Uplink grant, and/or Uplink assignment.

For example, as the downlink assignment, DCI formats (e.g., DCI format 1, DCI format 1A, and/or DCI format 1C) to be used for the scheduling of one PDSCH in one cell may be defined.

Furthermore, as the uplink grant, DCI formats (e.g., DCI format 0 and/or DCI format 4; also described as a first UL grant or first UL DCI below) to be used for the scheduling of one PUSCH in one cell may be defined.

For example, the first UL grant may include a Carrier Indicator Field (CIF). Further, the first UL grant may include information related to a Transmission Power Control Command (TPC command) for the PUSCH to be scheduled. The first UL grant may include information related to a cyclic shift for the DMRS (DMRS associated with transmission of the PUSCH). The first UL grant may include information related to a modulation and coding scheme (MCS) and/or information related to a redundancy version. The first UL grant may include information related to Resource block assignment and/or information related to hopping resource allocation. The first UL grant may include information (CSI request) to be used to request CSI transmission. The first UL grant may include information (SRS request) to be used to request SRS transmission.

Here, the first UL grant may be defined as DCI common to multiple terminal apparatuses 1 and/or DCI specific to a certain one terminal apparatus 1. In other words, the first UL grant may be transmitted in a common search space and/or a user equipment specific search space. The first UL grant may be transmitted on the PDCCH and/or the EPDCCH. CRC parity bits attached to the first UL grant may be scrambled with an RNTI to be described later.

The first UL grant may be used to define a configuration for a certain one subframe. In other words, the first UL grant may be used to indicate a configuration to be used in common in the certain one subframe. In other words, the configuration indicated by using the first UL grant may be effective for each one subframe. In other words, the first UL grant may be a subframe-specific UL grant. In other words, in a case that the PUSCH is scheduled by using the first UL grant, the terminal apparatus 1 may perform transmission on the scheduled PUSCH in a certain subframe (by using the entire certain subframe).

As the uplink grant, a DCI format (also described as a second UL grant or second UL DCI, below) including at least information associated with allocation of frequency resources to the PUSCH, the sPUSCH, and/or the sPDCCH (e.g., information associated with allocation of physical resource blocks to the PUSCH, the sPUSCH, and/or the sPDCCH) may be defined. In other words, the second UL grant may be used for scheduling of the PUSCH, the sPUSCH, and/or the sPDCCH at least.

For example, the second UL grant may include information associated with a bandwidth for the PUSCH to be scheduled, the sPUSCH to be scheduled, and/or the sPDCCH to be scheduled. In other words, the second UL grant may include information associated with a bandwidth to be scheduled for transmission on the PUSCH, transmission on the sPUSCH, and/or transmission on the sPDCCH.

For example, the second UL grant may include information associated with a start position (and/or an end position, e.g., the length from the start position) of the physical resource blocks for the PUSCH to be scheduled, the sPUSCH to be scheduled, and/or the sPDCCH to be scheduled. Further, the second UL grant may include information for indicating the physical resource blocks for the PUSCH to be scheduled, the sPUSCH to be scheduled, and/or the sPDCCH to be scheduled.

Here, the second UL grant may include a Carrier Indicator Field (CIF). Further, the second UL grant may include information related to a Transmission Power Control Command (TPC command) for the PUSCH to be scheduled. The second UL grant may include information related to a transmission power control command for the sPUSCH to be scheduled. The second UL grant may include information related to a cyclic shift for the DMRS (DMRS associated with transmission of the PUSCH and/or the sPUSCH). The second UL grant may include information related to a modulation and coding scheme (MCS) and/or information related to a redundancy version. The second UL grant may include information related to Resource block assignment and/or information related to hopping resource allocation. The second UL grant may include information (CSI request) to be used to request CSI transmission. The second UL grant may include information (SRS request) to be used to request SRS transmission.

Here, the information (part of the information or the entire information) transmitted by using the second UL grant may be transmitted by using higher layer signaling (e.g., MAC layer signalling and/or RRC layer signalling). In the following, a description will be given below of transmitting downlink control information as those described above by using the second UL grant. However, the downlink control information transmitted by using the second UL grant may be transmitted through higher layer signaling.

Here, the second UL grant may be defined as DCI (UL grant, Common UL grant, or Non-UE specific UL grant) common to multiple terminal apparatuses 1. In other words, the second UL grant may be transmitted only in a common search space to be described later. Alternatively, the second UL grant may be transmitted only on the PDCCH and/or the EPDCCH.

CRC parity bits attached to the second UL grant may be scrambled with an RNTI to be described later. Here, the CRC parity bits attached to the second UL grant may be scrambled with a first UL-RNTI. Moreover, the search space (e.g., the common search space) in which the second UL grant is transmitted may be given at least by the first UL-RNTI.

The second UL grant may be used to define a configuration for a certain one subframe. In other words, the second UL grant may be used to indicate a configuration to be used in common in the certain one subframe. In other words, the configuration indicated by using the second UL grant may be effective for each one or multiple subframes. In other words, the second UL grant may be a subframe-specific UL grant (a sub-frame specific UL grant). In other words, in a case that the PUSCH is scheduled by using the second UL grant, the terminal apparatus 1 may perform transmission on the scheduled PUSCH in a certain subframe (by using the entire certain subframe).

As the uplink grant, a DCI format (also described as a third UL grant or third UL DCI, below) including at least information related to allocation of time resources to the PUSCH and/or the sPUSCH may be defined. For example, the third UL grant may include information associated with allocation of a Transmission Time Interval (TTI) for transmission on the PUSCH and/or the sPUSCH. In other words, the third UL grant may be used for scheduling of the PUSCH and/or the sPUSCH at least.

For example, the third UL grant may include information associated with the length of the transmission time interval for the PUSCH to be scheduled and/or the sPUSCH to be scheduled. Furthermore, the third UL grant may include information associated with the position of the DMRS transmitted together with the PUSCH to be scheduled. The third UL grant may include information associated with the position of the DMRS transmitted together with the sPUSCH to be scheduled.

The third UL grant may include information related to the DMRS (e.g., information related to the cyclic shift of the DMRS) transmitted together with the PUSCH to be scheduled. The third UL grant may include information related to the DMRS (e.g., information related to the cyclic shift of the DMRS) transmitted together with the sPUSCH to be scheduled. The third UL grant may include information related to delay (Grant to Tx delay offset) for transmission on the PUSCH and/or transmission on the sPUSCH, based on reception (detection) of the third UL grant.

Here, the third UL grant may include a Carrier Indicator Field (CIF). Further, the third UL grant may include information related to a Transmission Power Control Command (TPC command) for the PUSCH to be scheduled. The third UL grant may include information related to a transmission power control command for the sPUSCH to be scheduled. The third UL grant may include information related to a cyclic shift for the DMRS (DMRS associated with transmission of the PUSCH and/or the sPUSCH). The third UL grant may include information related to a modulation and coding scheme (MCS) and/or information related to a redundancy version. The third UL grant may include information related to Resource block assignment and/or information related to hopping resource allocation. The third UL grant may include information (CSI request) to be used to request CSI transmission. The third UL grant may include information (SRS request) to be used to request SRS transmission. The third UL grant may include information related to a TTI index to be described later.

Here, the third UL grant may be defined as DCI (UL grant or UE-specific UL grant) specific to a certain one terminal apparatus 1. In other words, the third UL grant may be transmitted only in a UE-specific search space to be described later. The third UL grant may be transmitted on the PDCCH, the EPDCCH, and/or the sPDCCH. The third UL grant may be transmitted on the PDSCH.

CRC parity bits attached to the third UL grant may be scrambled with an RNTI to be described later. Here, the CRC parity bits attached to the third UL grant may be scrambled with a third UL-RNTI. Moreover, the search space (e.g., the UE-specific search space) in which the third UL grant is transmitted may be given at least by the second UL-RNTI.

The third UL grant may be used to define a configuration for a certain one transmission time interval. In other words, the third UL grant may be used to indicate a configuration to be used in the certain one transmission time interval. In other words, the configuration indicated by using the third UL grant may be effective for one transmission time interval. In other words, the second UL grant may be a TTI specific UL grant. In other words, in a case that the PUSCH is scheduled by using the third UL grant, the terminal apparatus 1 may perform transmission on the scheduled PUSCH in a certain transmission time interval (in a certain transmission time interval in a certain subframe).

Here, as described above, the second UL grant may be used for scheduling of the sPDCCH on which the third UL grant is to be transmitted. For example, the terminal apparatus 1 may receive (detect) the second UL grant to thereby receive (detect) the third UL grant. The terminal apparatus 1 may monitor (decode or detect) the PDCCH and/or the EPDCCH on which the second UL grant is transmitted, to thereby monitor (decode or detect) the PDCCH, the EPDCCH, and/or the sPDCCH on which the third UL grant is transmitted.

Here, the PDCCH and/or the EPDCCH on which the second UL grant is transmitted, may be detected through monitoring by the terminal apparatus 1, and the resources of the PDCCH, the EPDCCH, and/or the sPDCCH on which the third UL grant is transmitted may be directly indicated by information included in the second UL grant. Here, the resources of the PDCCH, the EPDCCH, and/or the sPDCCH may include time resources and/or frequency resources. In other words, the PDCCH, the EPDCCH, and/or the sPDCCH on which the third UL grant is transmitted need not be monitored by the terminal apparatus 1.

In the following, the uplink grant (DCI format) may include the first UL grant, the second UL grant, and/or the third UL grant.

Here, in a case that a PDSCH resource is scheduled using downlink assignment, the terminal apparatus 1 may receive downlink data on the PDSCH, based on the scheduling. In a case that a PUSCH resource is scheduled using the uplink grant, the terminal apparatus 1 may transmit uplink data and/or uplink control information on the PUSCH, based on the scheduling. In a case that a sPUSCH resource is scheduled using the uplink grant, the terminal apparatus 1 may transmit uplink data and/or uplink control information on the sPUSCH, based on the scheduling.

The terminal apparatus 1 may monitor a set of PDCCH candidates, EPDCCH candidates, and/or sPDCCH candidates. The PDCCH may include the EPDCCH and/or the sPDCCH below.

Here, the PDCCH candidates may indicate candidates which the PDCCH may be mapped to and/or transmitted on by the base station apparatus 3. Furthermore "monitor" may imply that the terminal apparatus 1 attempts to decode each PDCCH in the set of PDCCH candidates in accordance with each of all the monitored DCI formats.

Here, the set of PDCCH candidates to be monitored by the terminal apparatus 1 is also referred to as a search space. The search space may include a Common Search Space (CSS). For example, the common search space may be defined as a space common to multiple terminal apparatuses 1.

The search space may include a UE-specific Search Space (USS). For example, the UE-specific search space may be given at least based on a C-RNTI assigned to the terminal apparatus 1. The terminal apparatus 1 may monitor PDCCHs in the common search space and/or the UE-specific search space to detect a PDCCH destined for the terminal apparatus 1 itself.

An RNTI assigned to the terminal apparatus 1 by the base station apparatus 3 may be used for the transmission of the downlink control information (transmission on the PDCCH). Specifically, Cyclic Redundancy check (CRC) parity bits are attached to the DCI format (or downlink control information), and after the attaching, the CRC parity bits may be scrambled with the RNTI. Here, the CRC parity bits attached to the DCI format may be obtained from a payload of the DCI format.

Here, in the present embodiment, "CRC parity bit", "CRC bit", and "CRC" may be the same. Moreover, "PDCCH for transmitting the DCI format to which CRC parity bits are attached", "PDCCH including CRC parity bits and including DCI format", "PDCCH including CRC parity bits", and "PDCCH including DCI format" may be the same. "PDCCH including X" and "PDCCH with X" may be the same. The terminal apparatus 1 may monitor DCI formats. The terminal apparatus 1 may monitor DCI. The terminal apparatus 1 may monitor PDCCHs.

The terminal apparatus 1 attempts to decode the DCI format to which the CRC parity bits scrambled with the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled with the RNTI. The terminal apparatus 1 may detect the PDCCH including the DCI format to which the CRC parity bits scrambled with the RNTI are attached.

Here, the RNTI may include a Cell-Radio Network Temporary Identifier (C-RNTI). For example, the C-RNTI may be an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). For example, the SPS C-RNTI is an identifier unique to the terminal apparatus 1 and used for semi-persistent scheduling. The SPS C-RNTI may be used for semi-persistently scheduled unicast transmission. Here, the semi-persistently scheduled transmission may include meaning of periodically scheduled transmission.

The RNTI may include a Random Access RNTI (RA-RNTI). For example, the RA-RNTI may be an identifier used for transmission of a random access response message. In other words, the RA-RNTI may be used for the transmission of the random access response message in a random access procedure. For example, the terminal apparatus 1 may monitor the PDCCH with the CRC scrambled with the RA-RNTI after the transmission of a random access preamble. The terminal apparatus 1 may receive a random access response on the PDSCH in accordance with detection of the PDCCH with the CRC scrambled with the RA-RNTI.

Here, the PDCCH with the CRC scrambled with the C-RNTI may be transmitted in the USS or CSS. The PDCCH with the CRC scrambled with the SPS C-RNTI may be transmitted in the USS or CSS. The PDCCH with the CRC scrambled with the RA-RNTI may be transmitted only in the CSS.

The PDSCH is used to transmit downlink data (Downlink Shared Channel (DL-SCH)). The PDSCH is used to transmit a system information message. Here, the system information message may be cell-specific information. The system information may be included in RRC signalling. The PDSCH may be used to transmit the RRC signalling and the MAC control element.

The PDSCH may be used to transmit the third UL grant. For example, the terminal apparatus 1 may receive (detect)

the third UL grant (information included in the third UL grant) on the PDSCH scheduled by the base station apparatus 3.

The PMCH is used to transmit multicast data (Multicast Channel (MCH)).

In FIG. 1, the following downlink physical signals are used for downlink radio communication. Here, the downlink physical signals are not used to transmit the information output from the higher layers but is used by the physical layer.

Synchronization signal (SS)
Downlink Reference Signal (DL RS)

The Synchronization signal is used in order for the terminal apparatus 1 to be synchronized to frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used in order for the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

Here, the downlink physical channels and the downlink physical signals are also collectively referred to as a downlink signal. The uplink physical channels and the uplink physical signals are also collectively referred to as an uplink signal. The downlink physical channels and the uplink physical channels are also collectively referred to as a physical channel. The downlink physical signals and the uplink physical signals are also collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

Figure 2:
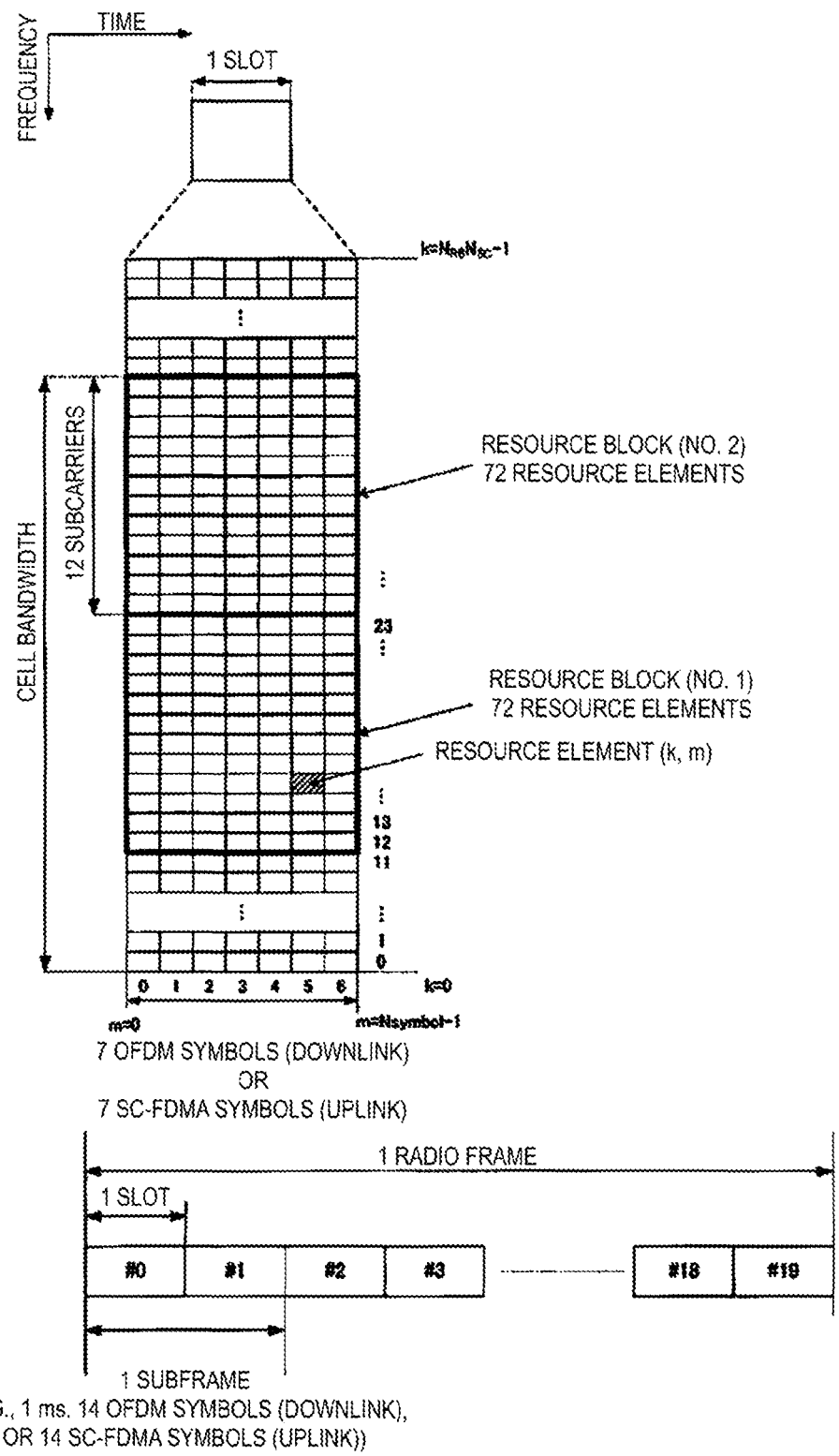
FIG. 2 is a diagram illustrating a configuration of a radio resource according to the present embodiment.

FIG. 2 is a diagram illustrating the configuration of the slot according to the present embodiment. Here, a normal Cyclic Prefix (CP) may apply to an OFDM symbol. Alternatively, an extended Cyclic Prefix (CP) may apply to the OFDM symbol. The physical signal or physical channel transmitted in each of the slots may be expressed by a resource grid.

Here, in the downlink, the resource grid may be defined with multiple subcarriers and multiple OFDM symbols. In the uplink, the resource grid may be defined with multiple subcarriers and multiple SC-FDMA symbols. Each element within the resource grid is referred to as a resource element.

Here, the resource element may be expressed by a frequency-domain index k and a time-domain index m. In other words, the resource element may be identified by using a subcarrier number (frequency-domain index k) and an OFDM symbol or SC-FDMA symbol number (time-domain index m).

Specifically, in a case that the resource block size in the frequency domain expressed as the number of subcarriers is denoted by $N_{sc}$ and the configuration of the downlink bandwidth expressed as a multiple of $N_{sc}$ is denoted by $N_{RB}$, in the downlink, the subcarrier number may be indicated as k=0, . . . , $N_{RB}N_{SC}$−1. Moreover, in a case that the resource block size in the frequency domain expressed as the number of subcarriers is denoted by $N_{sc}$ and the configuration of the uplink bandwidth expressed as a multiple of $N_{sc}$ is denoted by $N_{RB}$, in the uplink, the subcarrier number may be indicated as k=0, . . . , $N_{RB}N_{SC}$−1.

In a case that the OFDM symbol number in one downlink slot is denoted by $N_{symbol}$, the OFDM symbol number may be indicated as m=0, . . . , $N_{symbol}$−1. In a case that the SC-FDMA symbol number in one uplink slot is denoted by $N_{symbol}$, the SC-FDMA symbol number may be indicated as m=0, . . . , $N_{symbol}$−1.

Here, a resource block may be used to express mapping of a certain physical channel (PDSCH, PUSCH, or the like) to resource elements. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot in the time domain and correspond to 180 kHz in the frequency domain.

One radio frame may be constituted of 20 slots numbered #0 to #19. For example, one radio frame may be 10 ms. Moreover, one subframe may be constituted of two consecutive slots. For example, one subframe may be 1 ms, and a subframe n may be constituted of slots 2n and 2n+1. Specifically, one subframe in the downlink may be 1 ms and may be constituted of 14 OFDM symbols. Moreover, one subframe in the uplink may be 1 ms and may be constituted of 14 SC-FDMA symbols.

For example, one subframe in the downlink may be constituted of 14 OFDM symbols. One slot in the downlink may be constituted of seven OFDM symbols. One subframe in the uplink may be constituted of 14 SC-FDMA symbols. One slot in the uplink may be constituted of 14 SC-FDMA symbols.

Here, a Transmission Time Interval (TTI) may be defined for transmission in the downlink and/or transmission in the uplink. In other words, the transmission in the downlink and/or the transmission in the uplink may be performed in one transmission time interval (length of one transmission time interval).

For example, in the downlink, the transmission time interval of the length of 1, 2, 3, 4, 5 (1 slot), 6, 7, 8, 9, 10, 11, 12, 13, and/or 14 (1 subframe) may be defined. In other words, in the downlink, the length of the transmission time interval may be 1, 2, 3, 4, 5 (1 slot), 6, 7, 8, 9, 10, 11, 12, 13, and/or 14 (1 subframe) OFDM symbols.

In the uplink, the transmission time interval of the length of 1, 2, 3, 4, 5 (1 slot), 6, 7, 8, 9, 10, 11, 12, 13, and/or 14 (1 subframe) may be defined. In other words, in the uplink, the length of the transmission time interval may be 1, 2, 3, 4, 5 (1 slot), 6, 7, 8, 9, 10, 11, 12, 13, and/or 14 (1 subframe) SC-FDMA symbols.

Now, carrier aggregation will be described.

Here, one or multiple serving cells may be configured for the terminal apparatus 1. A technology in which the terminal apparatus 1 communicates via the multiple serving cells is referred to as cell aggregation or carrier aggregation.

One or multiple configured serving cells may include one primary cell and one or multiple secondary cells. The primary cell may be a serving cell on which an initial connection establishment procedure has been performed, a serving cell in which a connection re-establishment procedure has been started, or a cell indicated as a primary cell during a handover procedure. The primary cell may be a cell used to transmit the PUCCH. Here, at the time when an RRC connection is established or later, a secondary cell(s) may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the base station apparatus 3 may configure one or multiple serving cells through higher layer signaling (e.g., RRC signalling). For example, one or multiple secondary cells may be configured to form a set of multiple serving cells with a primary cell.

The base station apparatus 3 may activate or deactivate one or multiple serving cells through higher layer signaling (for example, a MAC control element). For example, the base station apparatus 3 may activate or deactivate one or multiple serving cells among one or multiple serving cells configured through RRC signalling. Here, the terminal apparatus 1 may transmit CSI (e.g., aperiodic CSI) only for the activated serving cell(s).

Linking may be defined between the uplink (e.g., uplink component carrier) and the downlink (e.g., the downlink component carrier). In other words, in accordance with the linking between the uplink and the downlink, the serving cell for downlink assignment (serving cell on which PDSCH transmission scheduled via downlink assignment (downlink transmission) is performed) may be identified. In accordance with the linking between the uplink and the downlink, the serving cell for uplink grant (serving cell on which (s)PUSCH transmission scheduled via uplink grant (uplink transmission) is performed) may be identified. Here, there is no carrier indicator field in the downlink assignment or the uplink grant in this case.

In other words, the downlink assignment received in the primary cell may correspond to downlink transmission in the primary cell. Moreover, the uplink grant received in the primary cell may correspond to uplink transmission in the primary cell. The downlink assignment received in a certain secondary cell may correspond to downlink transmission in the certain secondary cell. The uplink grant received in the certain secondary cell may correspond to uplink transmission in the certain secondary cell.

Figure 3:
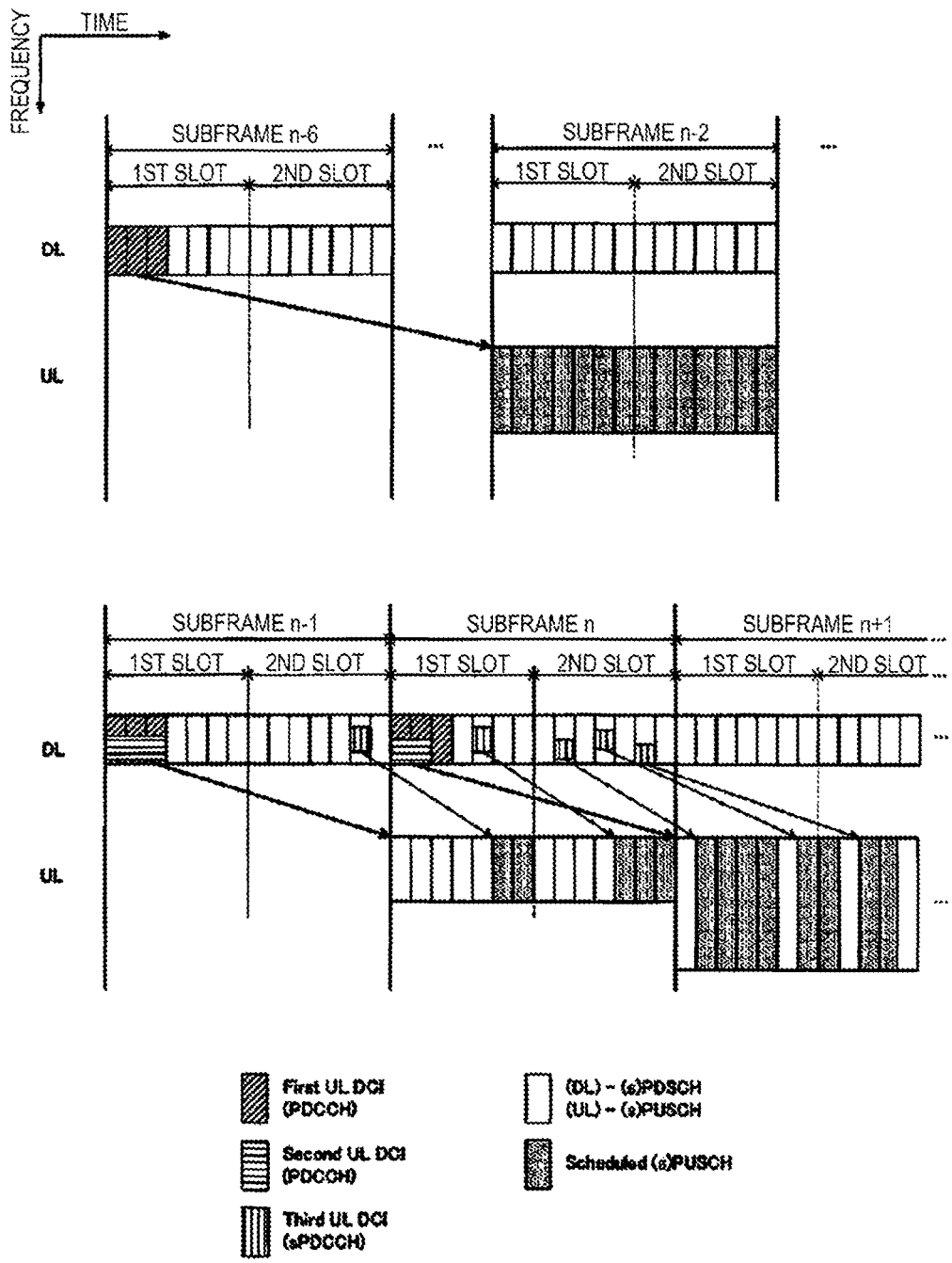
FIG. 3 is a diagram illustrating a method of transmitting channel state information according to the present embodiment.

FIG. 3 is a diagram illustrating a method of transmitting channel state information according to the present embodiment. As described above, one subframe may be constituted of two consecutive slots (first slot and second slot). One slot may be constituted of seven OFDM symbols (downlink) or seven SC-FDMA symbols (uplink).

Here, a field mapped to information used to request CSI transmission (CSI request) is also referred to as a CSI request field. As described above, the CSI request field may be included in the first UL grant. The CSI request field may be included in the second UL grant. The CSI request field may be included in the third UL grant. In the following, a description will be given of the CSI request field being included in the first UL grant and the third UL grant. However, the CSI request field included in the third UL grant may be replaced with the CSI request field included in the second UL grant.

For example, the base station apparatus 3 may trigger CSI transmission on the PUSCH (also referred to as aperiodic CSI report) by setting to trigger a report by using the CSI request field. In a case that the CSI request field is set to trigger a report, the terminal apparatus 1 may perform aperiodic CSI reporting.

For example, the base station apparatus 3 may set to trigger a report by using the CSI request field set to "1" (1-bit CSI request field). The base station apparatus 3 may set to trigger a report by using the CSI request field set to "01", "10", or "11" (2-bit CSI request field). Similarly, the base station apparatus 3 may set to trigger a report by using a 3-bit CSI request field.

In a case of setting to trigger a report by using a CSI request field, based on decoding of the uplink grant (e.g., first UL grant) for a certain serving cell in subframe n, the terminal apparatus 1 may perform aperiodic CSI reporting on the PUSCH in the certain serving cell in subframe n+k (e.g., k is a positive integer and may be four). Here, the PUSCH is mapped to all the SC-FDMA symbols included in one certain subframe. In other words, the terminal apparatus 1 may perform aperiodic CSI reporting on the PUSCH in all the SC-FDMA symbols included in one certain subframe.

In a case of setting to trigger a report by using a CSI request field, based on decoding of the uplink grant (e.g., third UL grant) for a certain serving cell in certain symbol (OFDM symbol) n, the terminal apparatus 1 may perform aperiodic CSI reporting on the sPUSCH in the certain serving cell in certain symbol (SC-FDMA symbol) n+m (e.g., m is a positive integer). Here, the sPUSCH is mapped to some of the SC-FDMA symbols (only some SC-FDMA symbols) included in one certain subframe. In other words, the terminal apparatus 1 may perform aperiodic CSI reporting on the PUSCH in some of the SC-FDMA symbols included in one certain subframe.

As illustrated in FIG. 3, the base station apparatus 3 may trigger an aperiodic CSI report by transmitting the first UL grant in subframe n-6. The terminal apparatus 1 may perform aperiodic CSI reporting on the PUSCH in subframe n-2.

The base station apparatus 3 may transmit the second UL grant in the first symbol (OFDM symbol) to the third symbol (OFDM symbol) in the first slot in subframe n-1. Here, the base station apparatus 3 may configure a subframe and/or a symbol (OFDM symbol) in which the terminal apparatus 1 monitors the second UL grant. For example, the base station apparatus 3 may transmit, through higher layer signaling (e.g., RRC signalling), information to be used to configure a subframe and/or a symbol (OFDM symbol) in which the terminal apparatus 1 monitors the second UL grant.

Here, the second UL grant may be effective in the subframe that is one subframe after the subframe in which the second UL grant is received. For example, the second UL grant received in subframe n-1 may indicate a configuration for subframe n. The second UL grant received in subframe n-1 may be used to indicate the bandwidth (frequency resources) for the PUSCH, the sPUSCH, and/or the sPDCCH used in subframe n.

In the sixth symbol (SC-FDMA symbol) in the second slot in subframe n-1, the base station apparatus 3 may trigger an aperiodic CSI report by transmitting the third UL grant. Here, the third UL grant may be transmitted on the sPDCCH. For example, the sPUSCH in the sixth and the seventh symbols (SC-FDMA symbols) in the first slot in subframe n may be scheduled by using the third UL grant.

In other words, transmission on the sPUSCH at a transmission time interval of a length of two (two SC-FDMA symbols) may be scheduled by using the second UL grant. To be more specific, the terminal apparatus 1 may perform transmission on the sPUSCH in the sixth and the seventh symbols (SC-FDMA symbols) in the first slot in subframe n, based on the scheduling by the base station apparatus 3. For example, the terminal apparatus 1 may perform aperiodic CSI reporting on the sPUSCH.

Similarly, the base station apparatus 3 may transmit the first UL grant and/or the second UL grant to thereby trigger an aperiodic CSI report, and the terminal apparatus 1 may perform aperiodic CSI reporting, based on scheduling by the base station apparatus 3 by using the sPUSCH.

FIG. 4 is a diagram illustrating the method of transmitting channel state information according to the present embodiment. In FIG. 4, R denotes transmission of a DMRS. In addition, D denotes transmission of uplink data and/or uplink control information (e.g., aperiodic CSI). In other words, R indicates an SC-FDMA symbol including DMRS associated with transmission on the sPUSCH. D indicates an SC-FDMA symbol including uplink data and/or uplink control information.

As described above, downlink control information (TTI index) illustrated in FIG. 4 may be included in the third UL grant. In other words, the base station apparatus 3 may transmit a TTI index by using the third UL grant. For example, the base station apparatus 3 may transmit the third UL grant including a CSI request field set to "1" and a TTI index. The terminal apparatus 1 may perform transmission on the sPUSCH, based on the TTI index included in the third UL grant. In other words, the terminal apparatus 1 may perform aperiodic CSI reporting, based on the value of the CSI request field and the value of the TTI index included in the third UL grant.

Here, for example, the TTI index may be used to indicate the length of the transmission time interval for transmission on the sPUSCH. The TTI index may be used to indicate the position of the DMRS transmitted together with the sPUSCH. The TTI index may be used to indicate the value of the cyclic shift of the DMRS transmitted together with the sPUSCH. The TTI index may be used to indicate an offset (offset value) of a delay (delay time) for transmission on the sPUSCH based on reception (detection) of the third UL grant.

FIG. 4 illustrates that the length of the transmission time interval for transmission on the sPUSCH, the position of the DMRS transmitted together with the sPUSCH, and the value of the cyclic shift of the DMRS transmitted together with the sPUSCH, and the delay offset for the transmission on the sPUSCH based on the reception of the third UL grant are indicated based on one value set in the field to which the TTI index is mapped.

Here, it is apparent that fields to which respective pieces of information to be used to indicate the length of the transmission time interval for transmission on the sPUSCH, the position of the DMRS transmitted together with the sPUSCH, and the value of the cyclic shift of the DMRS transmitted together with the sPUSCH, and the delay offset for the transmission on the sPUSCH based on the reception of the third UL grant may be defined individually.

For example, as illustrated in FIG. 4, in a case that "13" is set as a value of the TTI index, transmission on the sPUSCH at the transmission time interval of a length of four (four SC-FDMA symbols) may be indicated. Meanwhile, in a case that "13" is set as a value of the TTI index, the third SC-FDMA symbol may be indicated as the position of the DMRS (the third SC-FDMA symbol may be indicated as an SC-FDMA symbol in which the DMRS is to be included).

In a case that "13" is set as a value of the TTI index, "4" may be indicated as the value of a cyclic shift to be applied to the DMRS. In a case that "13" is set as a value of the TTI index, "0 (zero SC-FDMA symbol)" may be indicated as a delay offset for transmission on the sPUSCH based on reception of the third UL grant.

Similarly, in a case that "14" is set as a value of the TTI index, "2 (two SC-FDMA symbols)" may be indicated as a delay offset for transmission on the sPUSCH based on reception of the second UL grant. In other words, delay of transmission on the sPUSCH based on reception of the third UL grant (position of the first symbol (SC-FDMA symbol) for transmission) for "2 (two SC-FDMA symbols)" may be indicated.

Here, the length of the transmission time interval for transmission on the sPUSCH, the position of the DMRS transmitted together with the sPUSCH, the value of the cyclic shift of the DMRS transmitted together with the sPUSCH, and/or the delay offset for the transmission on the sPUSCH based on the reception of the third UL grant may be configured by using information included in higher layer signaling (e.g., RRC signalling).

Moreover, multiple values (e.g., four values) indicating the lengths of the transmission time interval for transmission on the sPUSCH may be configured by using information included in higher layer signaling, and one of the multiple values may be indicated by using information (e.g., 2-bit information) included in the third UL grant.

Alternatively, multiple values (e.g., four values) indicating the positions of the DMRS transmitted together with the sPUSCH may be configured by using information included in higher layer signaling, and one of the multiple values may be indicated by using information (e.g., 2-bit information) included in the third UL grant.

Multiple values (e.g., four values) indicating the values of cyclic shift of the DMRS transmitted together with the sPUSCH may be configured by using information included in higher layer signaling, and one of the multiple values may be indicated by using information (e.g., 2-bit information) included in the third UL grant.

Multiple values (e.g., four values) indicating the delay offsets for transmission on the PUSCH (sPUSCH) based on the reception of the third UL grant may be configured by using information included in higher layer signaling, and one of the multiple values may be indicated by using information (e.g., 2-bit information) included in the third UL grant.

Multiple sets of values (e.g., four sets of values) indicating the length of the transmission time interval for transmission on the sPUSCH, the position of the DMRS transmitted together with the sPUSCH, the value of the cyclic shift of the DMRS transmitted together with the sPUSCH, and/or the delay offset for the transmission on the sPUSCH based on the reception of the third UL grant may be configured by using information included in higher layer signaling, and one of the multiple sets of values may be indicated by using information (e.g., 2-bit information) included in the third UL grant.

In other words, the length of the transmission time interval for transmission on the sPUSCH, the position of the DMRS transmitted together with the sPUSCH, and the value of the cyclic shift of the DMRS transmitted together with the sPUSCH, and/or the delay offset for the transmission on the sPUSCH based on the reception of the third UL grant may be indicated by one value set in information (e.g., 2-bit information) included in the third UL grant.

FIG. 5 is a diagram illustrating the method of transmitting channel state information according to the present embodiment. As illustrated in FIG. 5, fixed delay (fixed delay time) may be defined between the first symbol of an UL grant (e.g., the third UL grant) and the first symbol for performing transmission on the sPUSCH, for each length of transmission time interval for performing transmission on the sPUSCH. Here, the fixed delay (fixed delay time) may correspond to the value m (e.g., m is a positive integer) described above.

For example, as the fixed delay between the first symbol of an UL grant (e.g., the third UL grant) and the first symbol for performing transmission on the sPUSCH, the value obtained by multiplying the length of the transmission time interval by four may be defined. Here, for example, the fixed delay may be defined by a specification or the like and may be a value known to the base station apparatus 3 and the terminal apparatus 1.

In other words, for example, in a case that an UL grant (e.g., the first symbol of the third UL grant) is detected in symbol (OFDM symbol) "n", transmission on the sPUSCH at transmission time interval of a length of two (two SC-FDMA symbols) may be performed in symbol (SC-FDMA symbol) "n+8". For example, the terminal apparatus 1 may perform aperiodic CSI reporting on the sPUSCH.

Similarly, as illustrated in FIG. 5, transmission on the PUSCH (sPUSCH) may be performed with the fixed delay defined so as to correspond to each of the lengths of the transmission time interval. Here, as described above, the base station apparatus 3 may indicate an offset of a delay for transmission on the sPUSCH based on reception of the third UL grant.

In other words, for example, in a case that an UL grant (e.g., the first symbol of the third UL grant) is detected in symbol (OFDM symbol) "n", and "2 (two SC-FDMA)" is indicated as a delay offset, transmission on the sPUSCH at transmission time interval of a length of two (two SC-FDMA symbols) may be performed in symbol (SC-FDMA symbol) "n+10". For example, the terminal apparatus 1 may perform aperiodic CSI reporting on the sPUSCH.

Specifically, fixed delay between the first symbol of an UL grant (e.g., the third UL grant) and the first symbol for performing transmission on the PUSCH (sPUSCH) may be defined as the minimum delay between the first symbol of the UL grant (e.g., the third UL grant) and the first symbol for performing transmission on the sPUSCH.

The fixed delay between the first symbol of the UL grant (e.g., the third UL grant) and the first symbol for performing transmission on the sPUSCH may be defined as the Minimum number/amount of symbols before an UL HARQ retransmission is expected by the terminal apparatus 1.

Here, the base station apparatus 3 may configure, for the terminal apparatus 1, transmission on the sPUSCH at a transmission time interval having a length shorter than 1 ms (14 SC-FDMA symbols) (or a transmission time interval having a length of 1 ms (14 SC-FDMA symbols) or shorter). In the following, configuring, by the base station apparatus 3, transmission on the sPUSCH at a transmission time interval having a length shorter than 1 ms (14 SC-FDMA symbols) (or a transmission time interval having a length of 1 ms (14 SC-FDMA symbols) or shorter) is also described as configuring short Transmission Time Interval (sTTI) transmission.

Here, configuring sTTI transmission may include configuring transmission on the sPUSCH based on the second UL grant and/or the third UL grant. Configuring sTTI transmission may include configuring to monitor the second UL grant and/or the third UL grant by the terminal apparatus 1. Configuring sTTI transmission may include configuring a subframe in which the terminal apparatus 1 monitors the second UL grant and/or the third UL grant.

For example, the base station apparatus 3 may transmit higher layer signaling (e.g., RRC signalling) including information related to configuration of sTTI transmission. Here, the base station apparatus 3 may configure sTTI transmission for each serving cell. In a case that sTTI transmission is configured, the terminal apparatus 1 may perform transmission on the sPUSCH at a transmission time interval having a length shorter than 1 ms (14 SC-FDMA symbols) (or a transmission time interval having a length of 1 ms (14 SC-FDMA symbols) or shorter) as described above. For example, the terminal apparatus 1 may perform aperiodic CSI reporting on the sPUSCH.

FIG. 6 is a diagram for illustrating a reporting mode according to the present embodiment. Here, a reporting mode of an aperiodic CSI report is also described as a reporting mode.

For example, the base station apparatus 3 may configure a reporting mode through higher layer signaling (e.g., RRC signalling). Specifically, as a reporting mode, any of mode 1-0, mode 1-1, mode 1-2, mode 2-0, mode 2-2, mode 3-0, mode 3-1, and mode 3-2 as those illustrated in FIG. 6 may be configured.

The terminal apparatus 1 may perform aperiodic CSI reporting on the PUSCH in a certain subframe, based on a corresponding reporting mode (i.e., CQI and PMI feedback types as those illustrated in FIG. 6). The terminal apparatus 1 may perform aperiodic CSI reporting on the sPUSCH at a certain transmission time interval, based on a corresponding reporting mode.

For example, in a case that mode 1-0 is configured, only a single wideband CQI may be reported in a certain subframe. In a case that mode 1-2 is configured, a single CQI (wideband CQI) and multiple PMIs (subband PMIs) may be reported in a certain subframe.

In a case that mode 2-0 is configured, only a single CQI (wideband CQI) selected by the terminal apparatus 1 may be reported in a certain subframe. In a case that mode 2-2 is configured, a single CQI (wideband CQI) and multiple PMIs (subband PMIs) regarding a subband selected by the terminal apparatus 1 may be reported in a certain subframe.

In a case that mode 3-0 is configured, only a single CQI (wideband CQI) regarding a subband configured by the base station apparatus 3 may be reported in a certain subframe. In a case that mode 3-1 is configured, multiple CQIs (subband CQIs) and a single PMI regarding a subband configured by the base station apparatus 3 may be reported in a certain subframe. In a case that mode 3-2 is configured, multiple CQIs (subband CQIs) and multiple PMIs (subband CQIs) regarding a subband configured by the base station apparatus 3 may be reported in a certain subframe.

Here, the set of subbands (also referred to as a set S or set S subbands) evaluated with respect to CSI reporting by the terminal apparatus 1 may be widened to the entire downlink system bandwidth. In other words, the set S subbands may be the downlink system bandwidth. This means that the set S subbands may be in common to the aperiodic CSI report using the PUSCH and aperiodic CSI report using the sPUSCH. For example, the base station apparatus 3 may transmit information to be used to configure (determine) the set S subbands (common set S subbands).

Here, the set S subbands may be configured independently for the aperiodic CSI report using the PUSCH and the aperiodic CSI report using the sPUSCH. For example, the base station apparatus 3 may transmit information to be used to configure (determine) the set S subbands for the aperiodic CSI report using the PUSCH. The base station apparatus 3 may transmit information to be used to configure (determine) the set S subbands for the aperiodic CSI report using the sPUSCH.

The subband size to be used for CSI calculation (CSI transmission) may be common to the aperiodic CSI report using the PUSCH and the aperiodic CSI report using the sPUSCH. For example, the base station apparatus 3 may transmit information to be used to configure (determine) the subband size (common subband size).

The subband size may be configured independently for the aperiodic CSI report using the PUSCH and aperiodic CSI report using the sPUSCH. For example, the base station apparatus 3 may transmit information to be used to configure (determine) the subband size for the aperiodic CSI report using the PUSCH. The base station apparatus 3 may transmit information to be used to configure (determine) the subband size for the aperiodic CSI report using the sPUSCH.

Figure 7:
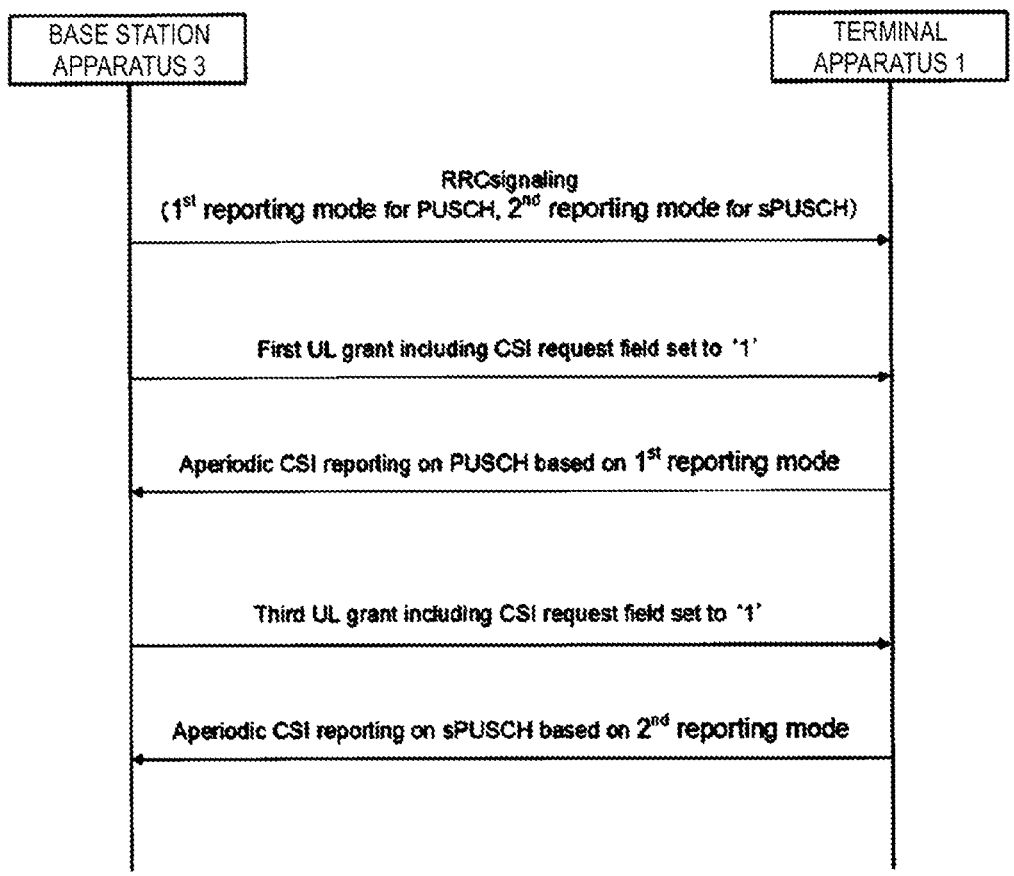
FIG. 7 is another diagram illustrating the method of transmitting channel state information according to the present embodiment.

FIG. 7 is a diagram for illustrating the method of transmitting channel control information according to the present embodiment.

For example, the base station apparatus 3 may configure a first reporting mode for the PUSCH and a second reporting mode for the sPUSCH through higher layer signaling (e.g., RRC signalling). In other words, the base station apparatus 3 may transmit information to be used to configure the first reporting mode for the PUSCH. The base station apparatus 3 may transmit information to be used to configure the second reporting mode for the sPUSCH. In other words, a reporting mode as those described above may be configured as the first reporting mode. A reporting mode as those described above may be configured as the second reporting mode.

Here, the first reporting mode may indicate a reporting mode to be used for the terminal apparatus 1 to perform aperiodic CSI reporting using the PUSCH. In other words, the base station apparatus 3 may configure a reporting mode for the aperiodic CSI report set to be triggered by the first UL grant.

The second reporting mode may indicate a reporting mode to be used for the terminal apparatus 1 to perform aperiodic CSI reporting using the sPUSCH. In other words, the base station apparatus 3 may configure a reporting mode for the aperiodic CSI report set to be triggered by the third UL grant.

Specifically, the base station apparatus 3 transmits the first UL grant including a CSI request field set to "1". The terminal apparatus 1 may perform aperiodic CSI reporting on the PUSCH by using the first reporting mode, based on detection (decoding) of the first UL grant including the CSI request field set to "1".

The base station apparatus 3 transmits the third UL grant including a CSI request field set to "1". The terminal apparatus 1 may perform aperiodic CSI reporting on the sPUSCH by using the second reporting mode, based on detection (decoding) of the third UL grant including the CSI request field set to "1".

In other words, the terminal apparatus 1 may perform aperiodic CSI reporting by using a different reporting mode even in a case that the value set for the CSI request field included in the first UL grant and the value set for the CSI request field included in the third UL grant are the same value ("1").

FIGS. 8A and 8B are diagrams for illustrating the method of transmitting channel control information according to the present embodiment.

Here, FIG. 8A indicates, in a case that the size of the CSI request field is one bit, a serving cell for which an aperiodic CSI report is triggered. FIG. 7A illustrates, in a case that the size of the CSI request field is one bit, a reporting mode in which an aperiodic CSI report is transmitted.

Similarly, FIG. 8B indicates, in a case that the size of the CSI request field is two bits, a serving cell for which an aperiodic CSI report is triggered. FIG. 8B illustrates, in a case that the size of the CSI request field is one bit, a reporting mode in which an aperiodic CSI report is transmitted.

Here, the size of the CSI request field may be determined at least based on the number of configured serving cells (downlink cells), a search space to which an UL grant (DCI format) is mapped, and/or a detected (decoded) UL grant.

For example, when one serving cell is configured for the terminal apparatus 1, a 1-bit field may be applied as the size of the CSI request field (to a CSI request). In a case that an UL grant (DCI format) is mapped to the common search space, a 1-bit field may be applied as the size of the CSI request field. In a case that a detected (decoded) UL grant is the second UL grant and/or the third UL grant, a 1-bit field may be applied as the size of the CSI request field. In other words, the size of the CSI request field included in the second UL grant and/or the third UL grant may be one bit in any case.

In a case that more than one and five or fewer (or fewer than five) serving cells are configured for the terminal apparatus 1 and the UL grant (DCI format) is mapped to a UE-specific search space, a 2-bit field may be applied as the size of the CSI request field. Here, as described above, the UE-specific search space may be given at least by C-RNTI. For example, in a case that more than one and five or fewer serving cells are configured for the terminal apparatus 1 and the first UL grant is mapped to a UE-specific search space, a 2-bit field may be applied as the size of the CSI request field.

Here, the base station apparatus 3 may transmit information to be used to configure that the size of the CSI request field included in the second UL grant and/or the third UL grant is two bits. For example, the base station apparatus 3 may transmit higher layer signaling (e.g., RRC signalling) including information to be used to configure that the size of the CSI request field included in the second UL grant and/or the third UL grant is two bits.

As described above, the base station apparatus 3 may configure a first reporting mode for the PUSCH and a second reporting mode for the sPUSCH through higher layer signaling (e.g., RRC signalling).

The terminal apparatus 1 may perform aperiodic CSI reporting by using the first reporting mode, based on detection (decoding) of the first UL grant including the CSI request field (1-bit CSI request field) set to "1". The terminal apparatus 1 may perform aperiodic CSI reporting by using the second reporting mode, based on detection (decoding) of the first 3L grant including the CSI request field set to "1" (1-bit CSI request field).

Here, in a case that the size of the CSI request field is one bit, the aperiodic CSI report may be triggered for a certain serving cell. Here, the aperiodic CSI report being triggered for a certain serving cell may indicate the aperiodic CSI report being triggered for the serving cell having the (s)PUSCH scheduled therefor by using the uplink grant including the CSI request field. To be more specific, in a case that the size of the CSI request field is one bit, the terminal apparatus 1 may report aperiodic CSI for the downlink component carrier corresponding to the uplink component carrier for which the (s)PUSCH is scheduled.

Here, in a case that the size of the CSI request field is two bits, the aperiodic CSI report may be triggered based on the value corresponding to the aperiodic CSI reporting. For example, in a case that the value of the CSI request field is "00", the aperiodic CSI report does not need to be triggered. In a case that the value of the CSI request field is "01", the aperiodic CSI report may be triggered for a certain serving cell. In a case that the value of the CSI request field is "10", the aperiodic CSI report may be triggered for a set of one or more serving cells configured by higher layers. In a case that the value of the CSI request field is "11", the aperiodic CSI report may be triggered for a set of one or more serving cells configured by higher layers.

In other words, the base station apparatus 3 may transmit information to be used to configure the first reporting mode for the PUSCH and information to be used to configure the second reporting mode for the sPUSCH, through higher layer signaling.

The base station apparatus 3 may transmit information to be used to configure the first set of one or multiple serving cells (also described as first information below) and/or information to be used to configure the third reporting mode (also described as second information below), for the PUSCH. The base station apparatus 3 may transmit information to be used to configure the second set of one or multiple serving cells (also described as third information below) and/or information to be used to configure the fourth reporting mode (also described as fourth information below), for the sPUSCH.

The base station apparatus 3 may transmit information to be used to configure the third set of one or multiple serving cells (also described as fifth information below) and/or information to be used to configure the fifth reporting mode (also described as sixth information below), for the PUSCH. The base station apparatus 3 may transmit information to be used to configure the fourth set of one or multiple serving cells (also described as seventh information below) and/or information to be used to configure the sixth reporting mode (also described as eighth information below), for the sPUSCH.

For example, the base station apparatus 3 may transmit higher layer signaling (e.g., RRC signalling) including the first information, the second information, the third information, the fourth information, the fifth information, the sixth information, the seventh information, and/or the eighth information. For example, the base station apparatus 3 may transmit higher layer signaling (e.g., RRC signalling) including the ninth information including the first information, the third information, the fifth information, and/or the seventh information. The base station apparatus 3 may transmit higher layer signaling (e.g., RRC signalling) including the tenth information including the second information, the fourth information, the sixth information, and/or the eighth information. In other words, the base station apparatus 3 may transmit higher layer signaling (e.g., RRC signalling) including the ninth information and/or the tenth information.

Here, each of the first information and/or the fifth information may be used to indicate a serving cell for which an aperiodic CSI report is triggered at the time when the terminal apparatus 1 performs aperiodic CSI reporting using the PUSCH. Each of the second information and/or the sixth information may be used to indicate a reporting mode to be used at the time when the terminal apparatus 1 performs aperiodic CSI reporting using the PUSCH.

Each of the third information and/or the seventh information may be used to indicate a serving cell for which an aperiodic CSI report is triggered at the time when the terminal apparatus 1 performs aperiodic CSI reporting using the sPUSCH. Each of the fourth information and/or the eighth information may be used to indicate a reporting mode to be used at the time when the terminal apparatus 1 performs aperiodic CSI reporting using the sPUSCH.

In other words, the base station apparatus 3 may configure a serving cell for which an aperiodic CSI report is triggered and/or a reporting mode to be used at the time of performing an aperiodic CSI report set to be triggered by the first UL grant. For example, the terminal apparatus 1 may report CSI for a configured set of serving cells by using the configured reporting mode, based on the value of the CSI request field included in the first UL grant.

In other words, a serving cell for which an aperiodic CSI report is triggered and/or a reporting mode to be used may be indicated based on the value of the CSI request field included in the first UL grant.

The base station apparatus 3 may configure a serving cell for which an aperiodic CSI report is triggered and/or a reporting mode to be used, at the time of performing an aperiodic CSI report set to be triggered by the third UL grant. For example, the terminal apparatus 1 may report CSI for a configured set of serving cells by using the configured reporting mode, based on the value of the CSI request field included in the third UL grant.

In other words, a serving cell for which an aperiodic CSI report is triggered and/or a reporting mode to be used may be indicated based on the value of the CSI request field included in the third UL grant.

As illustrated in FIG. 8B, the base station apparatus 3 may transmit higher layer signaling (e.g., RRC signalling) including the first information, the second information, the third information, the fourth information, the fifth information, the sixth information, the seventh information, and/or the eighth information.

Here, the base station apparatus 3 may transmit the first UL grant including a CSI request field set to "01". The terminal apparatus may perform aperiodic CSI reporting on the PUSCH, based on detection (decoding) of the first UL grant including the CSI request field set to "01". Here, the aperiodic CSI report triggered by the first UL grant including the CSI request field set to "01" may be triggered for a serving cell. The aperiodic CSI report triggered by the first UL grant including the CSI request field set to "01" may be transmitted by using the configured first reporting mode.

The base station apparatus 3 may transmit the third UL grant including a CSI request field set to "01". The terminal apparatus may perform aperiodic CSI reporting on the sPUSCH, based on detection (decoding) of the third UL grant including the CSI request field set to "01". Here, the aperiodic CSI report triggered by the third UL grant including the CSI request field set to "01" may be triggered for a serving cell. The aperiodic CSI report triggered by the third UL grant including the CSI request field set to "01" may be transmitted by using the configured second reporting mode.

The base station apparatus 3 may transmit the first UL grant including a CSI request field set to "10". The terminal apparatus may perform aperiodic CSI reporting on the PUSCH, based on detection (decoding) of the first UL grant including the CSI request field set to "10". Here, the aperiodic CSI report triggered by the first UL grant including the CSI request field set to "10" may be triggered for a set of serving cells (first set of one or multiple serving cells) configured by using the first information. The aperiodic CSI report triggered by the first UL grant including the CSI request field set to "10" may be transmitted by using the third reporting mode configured by using the second information.

The base station apparatus 3 may transmit the third UL grant including the CSI request field set to "10". The terminal apparatus may perform aperiodic CSI reporting on the sPUSCH, based on detection (decoding) of the third UL grant including the CSI request field set to "10". Here, the aperiodic CSI report triggered by the third UL grant including the CSI request field set to "10" may be triggered for a set of serving cells (second set of one or multiple serving cells) configured by using the third information. The aperiodic CSI report triggered by the third UL grant including a CSI request field set to "01" may be transmitted by using the fourth reporting mode configured by using the fourth information.

The base station apparatus 3 may transmit the first UL grant including a CSI request field set to "11". The terminal apparatus may perform aperiodic CSI reporting on the PUSCH, based on detection (decoding) of the first UL grant including the CSI request field set to "11". Here, the aperiodic CSI report triggered by the first UL grant including the CSI request field set to "11" may be triggered for a set of serving cells (third set of one or multiple serving cells) configured by using the fifth information. The aperiodic CSI report triggered by the first UL grant including a CSI request field set to "11" may be transmitted by using the fifth reporting mode configured by using the sixth information.

The base station apparatus 3 may transmit the third UL grant including a CSI request field set to "11". The terminal apparatus may perform aperiodic CSI reporting on the sPUSCH, based on detection (decoding) of the third UL grant including the CSI request field set to "11". Here, the aperiodic CSI report triggered by the third UL grant including the CSI request field set to "11" may be triggered for a set of serving cells (fourth set of one or multiple serving cells) configured by using the seventh information. The aperiodic CSI report triggered by the third UL grant including a CSI request field set to "11" may be transmitted by using the sixth reporting mode configured by using the eighth information.

In other words, the terminal apparatus 1 may determine a serving cell (or a set of serving cells) in which an aperiodic CSI report is to be triggered, based on the detected UL grant (first UL grant or third UL grant). Here, the serving cell (or the set of serving cells) in which the aperiodic CSI report is to be triggered may be determined based on the value of the CSI request field included in the detected UL grant (first UL grant or third UL grant).

The terminal apparatus 1 may determine a reporting mode to be used for aperiodic CSI reporting, based on the detected UL grant (first UL grant or third UL grant). The reporting mode to be used for aperiodic CSI reporting may be determined based on the value of the CSI request field included in the detected UL grant (first UL grant or third UL grant).

The terminal apparatus 1 may determine a serving cell (or a set of serving cells) in which an aperiodic CSI report is to be triggered, based on a channel (PUSCH or sPUSCH) on which aperiodic CSI reporting is to be performed. Here, a serving cell (or the set of serving cells) in which the aperiodic CSI report is to be triggered may be determined based on the value of the CSI request field included in an UL grant (first UL grant or third UL grant) to which the aperiodic CSI reporting corresponds.

The terminal apparatus 1 may determine a reporting mode to be used for aperiodic CSI reporting, based on a channel (PUSCH or sPUSCH) on which aperiodic CSI reporting is to be performed. Here, the reporting mode to be used for aperiodic CSI reporting may be determined based on the value of the CSI request field included in the UL grant (first UL grant or third UL grant) to which the aperiodic CSI reporting corresponds.

In other words, the terminal apparatus 1 may perform aperiodic CSI reporting for a different serving cell (or a different set of serving cells) even in a case that the value set for the CSI request field included in the first UL grant and the value set for the CSI request field included in the third UL grant are the same value. The terminal apparatus 1 may perform aperiodic CSI reporting by using a different reporting mode even in a case that the value set for the CSI request field included in the first UL grant and the value set for the CSI request field included in the third UL grant are the same value.

Here, for example, the base station apparatus 3 may transmit higher layer signaling (e.g., RRC signalling) that includes information to be used to configure the PUCCH (PUCCH resource) and/or information to be used to configure an interval (period). The terminal apparatus 1 may perform periodic CSI reporting on the PUCCH, based on the information to be used to configure the PUCCH and/or the information to be used to configure an interval. In other words, the terminal apparatus 1 may periodically transmit the CSI on the PUCCH.

In other words, the terminal apparatus 1 may perform periodic CSI reporting on the PUCCH in a certain subframe. Here, the PUCCH is mapped to all the SC-FDMA symbols included in one certain subframe. In other words, the terminal apparatus 1 may perform periodic CSI reporting on the PUCCH in all the SC-FDMA symbols included in one certain subframe.

For example, the base station apparatus 3 may transmit higher layer signaling (e.g., RRC signalling) that includes information to be used to configure the sPUCCH (sPUCCH resource) and/or information to be used to configure an interval (period). The terminal apparatus 1 may perform periodic CSI reporting on the sPUCCH, based on the information to be used to configure the sPUCCH and/or the information to be used to configure an interval. In other words, the terminal apparatus 1 may periodically transmit CSI on the sPUCCH.

In other words, the terminal apparatus 1 may perform periodic CSI reporting on the sPUCCH in a certain symbol (SC-FDMA symbol). Here, the sPUCCH is mapped to some of the SC-FDMA symbols included in one certain subframe. In other words, the terminal apparatus 1 may perform periodic CSI reporting on the PUCCH in some of the SC-FDMA symbols included in one certain subframe.

Here, the base station apparatus 3 may configure a reporting mode for the periodic CSI reporting (or the PUCCH) through higher layer signaling (e.g., RRC signalling). In other words, the base station apparatus 3 may transmit information to be used to configure the reporting mode for the periodic CSI reporting.

Here, the reporting mode for periodic CSI reporting may indicate the periodic CSI reporting of the terminal apparatus 1 on the PUCCH and the sPUCCH. In other words, the base station apparatus 3 may configure one common reporting mode for the periodic CSI reporting on the PUCCH and the periodic CSI reporting on the sPUCCH.

In other words, the terminal apparatus 1 may perform periodic CSI reporting on the PUCCH by using the reporting mode configured by the base station apparatus 3. The terminal apparatus 1 may perform periodic CSI reporting on the sPUCCH by using the reporting mode configured by the base station apparatus 3. Here, the reporting mode for periodic CSI reporting on the PUCCH and the reporting mode for the periodic CSI reporting on the sPUCCH may be the same.

Structures of apparatuses according to the present embodiment will be described below.

Figure 9:
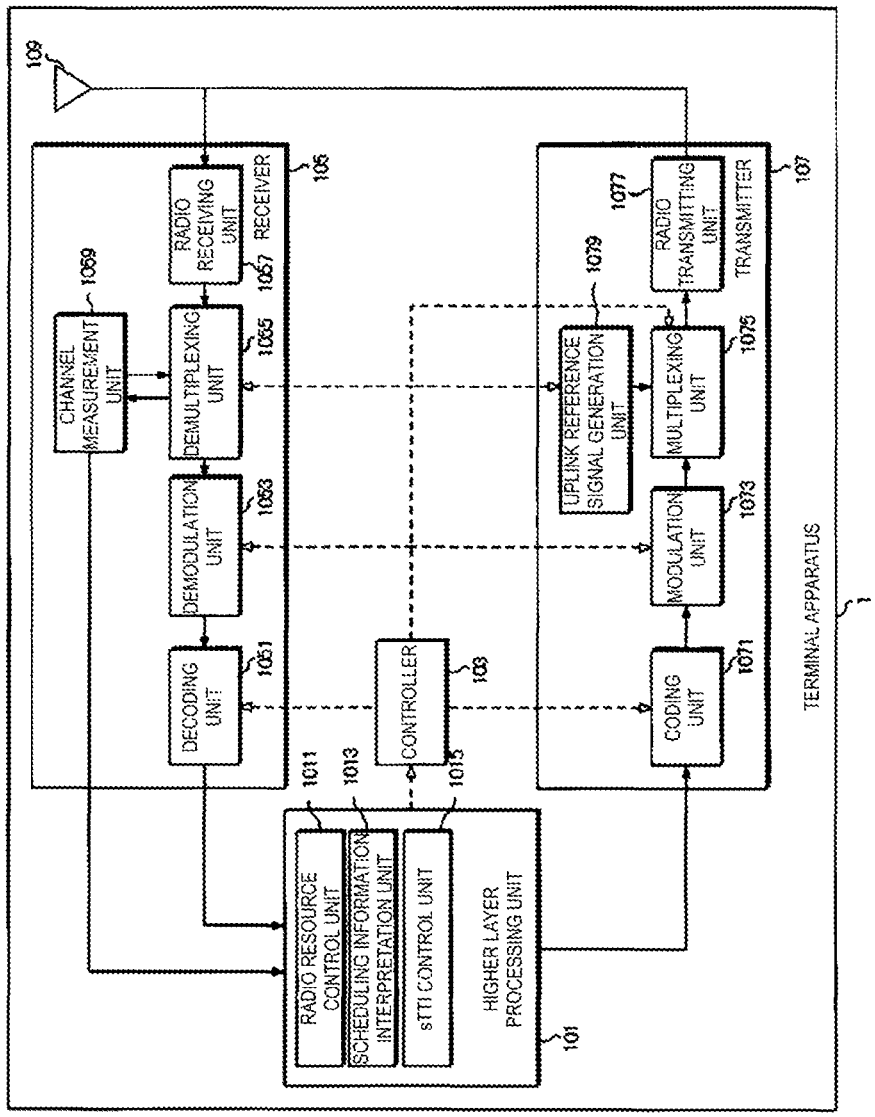
FIG. 9 is a schematic block diagram illustrating a configuration of a terminal apparatus 1 according to the present embodiment.

FIG. 9 is a schematic block diagram illustrating a configuration of the terminal apparatus 1 according to the present embodiment. As illustrated in FIG. 9, the terminal apparatus 1 is configured to include a higher layer processing unit 101, a controller 103, a receiver 105, a transmitter 107, and a transmit and receive antenna 109. The higher layer processing unit 101 is configured to include a radio resource control unit 1011, a scheduling information interpretation unit 1013, and a sTTI control unit 1015. The receiver 105 is configured to include a decoding unit 1051, a demodulation unit 1053, a demultiplexing unit 1055, a radio receiving unit 1057, and a channel measurement unit 1059. The transmitter 107 is configured to include a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal apparatus 1 itself. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmitter 107. The radio resource control unit 1011 is also referred to as a configuration unit 1011.

Here, the scheduling information interpretation unit 1013 included in the higher layer processing unit 101 interprets the DCI format (scheduling information, UL grant) received through the receiver 105, generates control information for control of the receiver 105 and the transmitter 107, in accordance with a result of interpreting the DCI format, and outputs the generated control information to the controller 103.

The sTTI control unit 1015 included in the higher layer processing unit 101 performs controls associated with sTTI transmission, based on various configuration information, and information or conditions associated with the SPS such as parameters.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the information resulting from the decoding, to the higher layer processing unit 101.

The radio receiving unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio receiving unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the PDSCH, and the downlink reference signal. Moreover, the demultiplexing unit 1055 makes a compensation of channels including the PHICH, the PDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH in compliance with a QPSK modulation scheme and outputs a result of the demodulation to the decoding unit 1051. The decoding unit 1051 attempts to decode the PDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information related to a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and receive antenna 109. Furthermore, the transmitter 107 transmits uplink control information.

The coding unit 1071 performs coding, such as convolutional coding or block coding, on the uplink control information input from the higher layer processing unit 101.

Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identifier (also referred to as a physical layer cell identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the controller 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 10:
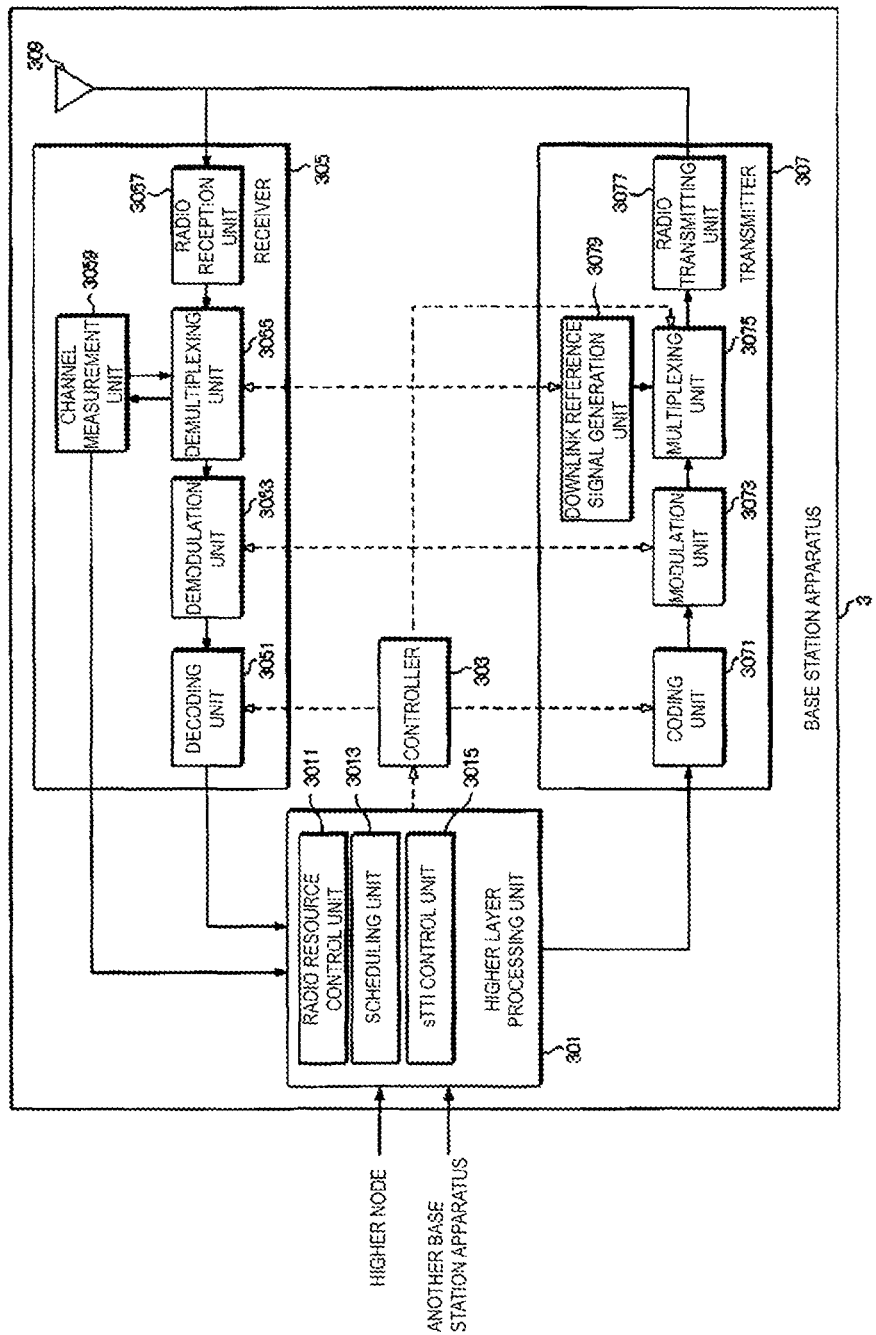
FIG. 10 is a schematic block diagram illustrating a configuration of a base station apparatus 3 according to the present embodiment.

FIG. 10 is a schematic block diagram illustrating a configuration of the base station apparatus 3 according to the present embodiment. As illustrated in FIG. 10, the base station apparatus 3 is configured to include a higher layer processing unit 301, a controller 303, a receiver 305, a transmitter 307, and a transmit and receive antenna 309. The higher layer processing unit 301 is configured to include a radio resource control unit 3011, a scheduling unit 3013, and a sTTI control unit 3015. The receiver 305 is configured to include a decoding unit 3051, a demodulation unit 3053, a demultiplexing unit 3055, a radio receiving unit 3057, and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmitter 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the receiver 305 and the transmitter 307 in accordance with a result of the scheduling, and outputs the generated information to the controller 303. The scheduling unit 3013 further determines timing of performing transmission processing and reception processing.

The sTTI control unit 3015 included in the higher layer processing unit 301 performs controls associated with the SPS, based on various configuration information, and information or conditions associated with the SPS such as parameters.

In accordance with the control information originating from the higher layer processing unit 301, the controller 303 generates a control signal for control of the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301. The radio receiving unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The receiver 305 receives the uplink control information.

The radio receiving unit 3057 removes a portion corresponding to a Cyclic Prefix (CP) from the digital signal resulting from the conversion. The radio receiving unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio receiving unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the controller 303, codes and modulates the HARQ indicator, the downlink control information, and the downlink data that are input from the higher layer processing unit 301, multiplexes the PHICH, the PDCCH, the PDSCH, and the downlink reference signal, and transmits a result of the multiplexing to the terminal apparatus 1 through the transmit and receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmitting unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

More specifically, the terminal apparatus 1 according to the present embodiment includes: the receiver 105 configured to receive information for configuring the first mode (reporting mode) for aperiodic CSI reporting and information for configuring the second mode (reporting mode) for aperiodic CSI reporting and receive an UL grant (first UL grant) to be used for scheduling of a PUSCH and an UL grant (third UL grant) to be used for scheduling of a sPUSCH; and the transmitter 107 configured to transmit CSI on the PUSCH by using the first mode in a first case that a first value of a CSI request field included in the UL grant to be used for scheduling of the PUSCH is set to trigger an aperiodic CSI report and transmit CSI on the sPUSCH by using the second mode in a second case that a second value of the CSI request field included in the UL grant to be used for scheduling of the sPUSCH is set to trigger the aperiodic CSI report.

The receiver 105 receives information for configuring a first set of one or multiple serving cells and information for configuring a second set of one or multiple serving cells, and the transmitter 107 transmits, in the first case, CSI of the first set of the one or multiple serving cells on the PUSCH by using the first mode and transmits, in the second case, CSI of the second set of the one or multiple serving cells on the sPUSCH by using the second mode.

Here, the first value and the second value are the same. In other words, the first value may be the same as the second value. The PUSCH is mapped to all SC-FDMA symbols included in a certain one subframe, and the sPUSCH is mapped to one or some SC-FDMA symbols included in a certain one subframe.

The receiver 105 receives information for configuring the third mode for periodic CSI reporting, and the transmitter 107 transmits CSI on either a PUCCH or a sPUCCH by using the third mode. Here, the PUCCH is mapped to all SC-FDMA symbols included in a certain one subframe, and the sPUCCH is mapped to one or some SC-FDMA symbols included in a certain one subframe.

The base station apparatus 3 according to the present embodiment includes: the transmitter 307 configured to transmit information for configuring the first mode (reporting mode) for aperiodic CSI reporting and information for configuring the second mode (reporting mode) for aperiodic CSI reporting and transmit an UL grant (first UL grant) to be used for scheduling of a PUSCH and an UL grant (third UL grant) to be used for scheduling of a sPUSCH; and the receiver 305 configured to receive CSI on the PUSCH by using the first mode in a first case that a first value of a CSI request field included in the UL grant to be used for scheduling of the PUSCH is set to trigger an aperiodic CSI report and receive CSI on the sPUSCH by using the second mode in a second case that a second value of the CSI request field included in the UL grant to be used for scheduling of the sPUSCH is set to trigger the aperiodic CSI report.

The transmitter 305 transmits information for configuring a first set of one or multiple serving cells and information for configuring a second set of one or multiple serving cells, and the receiver 307 receives, in the first case, CSI of the first set of the one or multiple serving cells on the PUSCH by using the first mode and receives, in the second case, CSI of the second set of the one or multiple serving cells on the sPUSCH by using the second mode.

Here, the first value and the second value are the same. In other words, the first value may be the same as the second value. The PUSCH is mapped to all SC-FDMA symbols included in a certain one subframe, and the sPUSCH is mapped to one or some SC-FDMA symbols included in a certain one subframe.

The transmitter 305 transmits information for configuring the third mode for periodic CSI reporting, and the receiver 307 receives CSI on either a PUCCH or a sPUCCH by using the third mode. Here, the PUCCH is mapped to all SC-FDMA symbols included in a certain one subframe, and the sPUCCH is mapped to one or some SC-FDMA symbols included in a certain one subframe.

According to the above, channel state information can be transmitted efficiently. For example, the reporting mode to be used for aperiodic CSI reporting on the PUSCH and the reporting mode to be used for aperiodic CSI reporting on the sPUSCH are configured individually, and this makes it possible to configure an optimal reporting mode and thereby to efficiently transmit channel state information.

Moreover, according to indication of a serving cell (or a set of serving cells) for and/or a reporting mode in which an aperiodic CSI report is to be triggered, based on a value of a CSI request field, more flexible switching of a serving cell (or a set of serving cells) for and/or a reporting mode in which an aperiodic CSI report is to be triggered is made possible, and this makes it possible to efficiently transmit channel state information.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiment of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Moreover, the terminal apparatus 1 and the base station apparatus 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiment is achieved as an aggregation (a device group) constituted of multiple devices. Each of the devices constituting such a device group may include some or all portions of each function or each functional block of the base station apparatus 3 according to the above-described embodiment. The device group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling information interpretation unit
1015 sTTI control unit
3011 Radio resource control unit
3013 Scheduling unit
3015 sTTI control unit

The invention claimed is:

1. A terminal apparatus comprising:
receiving circuitry configured to:
  receive, from a serving cell, a first downlink control information (DCI) format including a first channel state information (CSI) request field, the first DCI format being used for scheduling of a physical uplink shared channel (PUSCH) in a first transmission time interval (TTI) with a length of the first TTI equal to one subframe, and
  receive, from the serving cell, a second DCI format including a second CSI request field, the second DCI format being used for scheduling of a short PUSCH (sPUSCH) in a second TTI with a length of the second TTI shorter than the first TTI; and
transmitting circuitry configured to:
  perform a first aperiodic CSI reporting to the serving cell on the PUSCH in the first TTI based on detection of the first DCI format including the first CSI request field set to trigger the first aperiodic CSI reporting, and
  perform a second aperiodic CSI reporting to the serving cell on the sPUSCH in the second TTI based on detection of the second DCI format including the second CSI request field set to trigger the second aperiodic CSI reporting,
wherein:
a subband size for the first aperiodic CSI reporting triggered by the first CSI request field is different from a subband size for the second aperiodic CSI reporting triggered by the second CSI request field;
both a set of subbands for the first aperiodic CSI reporting triggered by the first CSI request field and a set of subbands for the second aperiodic CSI reporting triggered by the second CSI request field correspond to an entire downlink system bandwidth; and
a first quantity of symbols in the first TTI is larger than a second quantity of symbols in the second TTI.

2. A base station apparatus comprising:
transmitting circuitry configured to:
  transmit, to a terminal apparatus, a first downlink control information (DCI) format including a first channel state information (CSI) request field in a serving cell, the first DCI format being used for scheduling of a physical uplink shared channel (PUSCH) in a first transmission time interval (TTI) with a length of the first TTI equal to one subframe, and
  transmit, to the terminal apparatus, a second DCI format including a second CSI request field in the serving cell, the second DCI format being used for scheduling of a short PUSCH (sPUSCH) in a second TT1 with a length of the second TTI shorter than the first TTI; and
receiving circuitry configured to:
  receive a first aperiodic CSI reporting from the terminal apparatus on the PUSCH in the first TTI based on detection of the first DCI format including the first CSI request field set to trigger the first aperiodic CSI reporting, and
  receive a second aperiodic CSI reporting from the terminal apparatus on the sPUSCH in the second TTI based on detection of the second DCI format including the second CSI request field set to trigger the second aperiodic CSI reporting, wherein:
a subband size for the first aperiodic CSI reporting triggered by the first CSI request field is different from a subband size for the second aperiodic CSI reporting triggered by the second CSI request field;
both a set of subbands for the first aperiodic CSI reporting triggered by the first CSI request field and a set of subbands for the second aperiodic CSI reporting triggered by the second CSI request field correspond to an entire downlink system bandwidth; and a first quantity of symbols in the first TTI is larger than a second quantity of symbols in the second TTI.

3. A communication method of a terminal apparatus, comprising:

receiving, from a serving cell, a first downlink control information (DCI) format including a first channel state information (CSI) request field, the first DCI format being used for scheduling of a physical uplink shared channel (PUSCH) in a first transmission time interval (TTI) with a length of the first TTI equal to one subframe;

receiving, from the serving cell, a second DCI format including a second CSI request field, the second DCI format being used for scheduling of a short PUSCH (sPUSCH) in a second TTI with a length of the second TTI shorter than the subframe first TTI;

performing a first aperiodic CSI reporting to the serving cell on the PUSCH in the first TTI based on detection of the first DCI format including the first CSI request field set to trigger the first aperiodic CSI reporting; and performing a second aperiodic CSI reporting to the serving cell on the sPUSCH in the second TTI based on detection of the second DCI format including the second CSI request field set to trigger the second aperiodic CSI reporting, wherein a subband size for the first aperiodic CSI reporting triggered by the first CSI request field is different from a subband size for the second aperiodic CSI reporting triggered by the second CSI request field;

both a set of subbands for the first aperiodic CSI reporting triggered by the first CSI request field and a set of subbands for the second aperiodic CSI reporting triggered by the second CSI request field correspond to an entire downlink system bandwidth; and a first quantity of symbols in the first TTI is larger than a second quantity of symbols in the second TTI.

4. A communication method of a base station apparatus comprising:

transmitting, to a terminal apparatus, a first downlink control information (DCI) format including a first channel state information (CSI) request field in a serving cell, the first DCI format being used for scheduling of a physical uplink shared channel (PUSCH) in a first transmission time interval (TTI) with a length of the first TTI equal to one subframe;

transmitting, to the terminal apparatus, a second DCI format including a second CSI request field in the serving cell, the second DCI format being used for scheduling of a short PUSCH (sPUSCH) in a second TTI (TTI) with a length of the second TTI shorter than the first TTI;

receiving a first aperiodic CSI reporting from the terminal apparatus on the PUSCH in the first TTI based on detection of the first DCI format including the first CSI request field set to trigger the first aperiodic CSI reporting; and receiving a second aperiodic CSI reporting from the terminal apparatus on the PUSCH sPUSCH in the second TTI based on detection of the second DCI format including the second CSI request field set to trigger the second aperiodic CSI reporting, wherein a subband size for the first aperiodic CSI reporting triggered by the first CSI request field is different from a subband size for the second aperiodic CSI reporting triggered by the second CSI request field;

both a set of subbands for the first aperiodic CSI reporting triggered by the first CSI request field and a set of subbands for the second aperiodic CSI reporting triggered by the second CSI request field correspond to an entire downlink system bandwidth; and a first quantity of symbols in the first TTI is larger than a second quantity of symbols in the second TTI.

* * * * *